United States Patent
Prahlad et al.

(10) Patent No.: US 8,725,973 B2
(45) Date of Patent: May 13, 2014

(54) SYSTEMS AND METHODS FOR MANAGEMENT OF VIRTUALIZATION DATA

(71) Applicant: CommVault Systems, Inc., Oceanport, NJ (US)

(72) Inventors: Anand Prahlad, Bangalore (IN); Rahul S. Pawar, Marlboro, NJ (US); Prakash Varadharajan, Manalapan, NJ (US); Pavan Kumar Reddy Bedadala, Ocean City, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 13/667,890

(22) Filed: Nov. 2, 2012

(65) Prior Publication Data

US 2013/0061014 A1 Mar. 7, 2013

Related U.S. Application Data

(62) Division of application No. 12/553,294, filed on Sep. 3, 2009, now Pat. No. 8,307,177.

(60) Provisional application No. 61/094,753, filed on Sep. 5, 2008, provisional application No. 61/121,383, filed on Dec. 10, 2008, provisional application No. 61/169,515, filed on Apr. 15, 2009.

(51) Int. Cl.
*G06F 13/12* (2006.01)

(52) U.S. Cl.
USPC .................. 711/162; 711/6; 711/E12.002

(58) Field of Classification Search
USPC ....................... 711/6, 162, E12.002
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

International Preliminary Report on Patentability and Written Opinion for PCT/US2011/054374, dated Apr. 11, 2013, 6 pages.

(Continued)

*Primary Examiner* — Kenneth Lo
(74) *Attorney, Agent, or Firm* — Perkins Coie LLP

(57) ABSTRACT

Described in detail herein is a method of copying data of one or more virtual machines being hosted by one or more non-virtual machines. The method includes receiving an indication that specifies how to perform a copy of data of one or more virtual machines hosted by one or more virtual machine hosts. The method may include determining whether the one or more virtual machines are managed by a virtual machine manager that manages or facilitates management of the virtual machines. If so, the virtual machine manager is dynamically queried to automatically determine the virtual machines that it manages or that it facilitates management of. If not, a virtual machine host is dynamically queried to automatically determine the virtual machines that it hosts. The data of each virtual machine is then copied according to the specifications of the received indication.

21 Claims, 21 Drawing Sheets

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,581,076 B1 | 6/2003 | Ching et al. |
| 6,658,526 B2 | 12/2003 | Nguyen et al. |
| 7,035,880 B1 | 4/2006 | Crescenti et al. |
| 7,076,270 B2 | 7/2006 | Jaggers et al. |
| 7,107,298 B2 | 9/2006 | Prahlad et al. |
| 7,219,162 B2 | 5/2007 | Donker et al. |
| 7,246,207 B2 | 7/2007 | Kottomtharayil et al. |
| 7,395,282 B1 | 7/2008 | Crescenti et al. |
| 7,448,079 B2 | 11/2008 | Tremain |
| 7,730,035 B2 | 6/2010 | Berger et al. |
| 7,756,835 B2 | 7/2010 | Pugh |
| 7,756,964 B2 | 7/2010 | Madison, Jr. et al. |
| 7,840,537 B2 | 11/2010 | Gokhale et al. |
| 7,882,077 B2 | 2/2011 | Gokhale et al. |
| 7,899,788 B2 | 3/2011 | Chandhok et al. |
| 7,937,421 B2 | 5/2011 | Mikesell et al. |
| 8,069,271 B2 | 11/2011 | Brunet et al. |
| 8,140,786 B2 | 3/2012 | Bunte et al. |
| 8,219,524 B2 | 7/2012 | Gokhale |
| 8,307,177 B2 | 11/2012 | Prahlad et al. |
| 2006/0224846 A1 | 10/2006 | Amarendran et al. |
| 2006/0225065 A1* | 10/2006 | Chandhok et al. ............ 717/168 |
| 2007/0203938 A1 | 8/2007 | Prahlad et al. |
| 2007/0234302 A1 | 10/2007 | Suzuki et al. |
| 2008/0091655 A1* | 4/2008 | Gokhale et al. ................... 707/3 |
| 2008/0244177 A1 | 10/2008 | Crescenti et al. |
| 2009/0144416 A1 | 6/2009 | Chatley et al. |
| 2009/0319534 A1 | 12/2009 | Gokhale |
| 2009/0327471 A1 | 12/2009 | Astete et al. |
| 2010/0070725 A1 | 3/2010 | Prahlad et al. |
| 2010/0242096 A1 | 9/2010 | Varadharajan et al. |
| 2010/0332454 A1 | 12/2010 | Prahlad et al. |
| 2011/0087632 A1 | 4/2011 | Subramanian et al. |
| 2011/0093471 A1 | 4/2011 | Brockway et al. |
| 2012/0084262 A1 | 4/2012 | Dwarampudi et al. |
| 2012/0254364 A1 | 10/2012 | Vijayan |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

U.S. Appl. No. 13/765,389, filed Feb. 2, 2013, Kripalani.
U.S. Appl. No. 13/789,871, filed Mar. 8, 2013, Kumarasamy et al.
U.S. Appl. No. 13/790,028, filed Mar. 8, 2013, Kumarasamy et al.
U.S. Appl. No. 13/790,226, filed Mar. 8, 2013, Sancheti et al.
U.S. Appl. No. 13/926,332, filed Jun. 25, 2013, Dwarampudi et al.
Armstead et al., "Implementation of a Campus-wide Distributed Mass Storage Service: The Dream vs. Reality," *IEEE*, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995- Mar. 9, 1995, pp. 420-427, San Francisco, CA.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, internet accessed Mar. 24, 2008, 2 pages.
CommVault Systems, Inc., "Enhanced Protection and Manageability of Virtual Servers," Partner Solution Brief, 2008, 6 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008.

(56) References Cited

OTHER PUBLICATIONS

Davis, D., "Understanding VMware VMX Configuration Files," Petri IT Knowledgebase, <http://www.petri.co.il/virtual_vnnware_vmx_configuration_files.htm>, internet accessed on Jun. 19, 2008, 6 pages.

Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.

Davis, D., "VMware Versions Compared," Petri IT Knowledgebase, <http://www.petri.co.il/virtual_vmware_versions_compared.htm>, internet accessed on Apr. 28, 2008, 6 pages.

Eitel, "Backup and Storage Management in Distributed Heterogeneous Environments," *IEEE*, Jun. 12-16, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (Jun. 1988) (see in particular figure 5 in p. 15 and recitation in claim 5).

Microsoft Corporation, "How NTFS Works," Windows Server TechCenter, updated Mar. 28, 2003, internet accessed Mar. 26, 2008, 26 pages.

Rosenblum et al., "The Design and Implementation of a Log-Structured File System," *Operating Systems Review SIGOPS*, vol. 25, No. 5, New York, US, pp. 1-15 (May 1991).

Sanbarrow.com, "Disktype-table," <http://sanbarrow.com/vmdk/disktypes.html>, internet accessed on Jul. 22, 2008, 4 pages.

Sanbarrow.com, "Files Used by a VM," <http://sanbarrow.com/vmx/vmx-files-used-by-a-vm.html>, internet accessed on Jul. 22, 2008, 2 pages.

Sanbarrow.com, "Monolithic Versus Split Disks," <http://sanbarrow.com/vmdk/monolithicversusspllit.html>, internet accessed on Jul. 14, 2008, 2 pages.

VMware, Inc., "Open Virtual Machine Format," <http://www.vmware.com/appliances/learn/ovf.html>, internet accessed on May 6, 2008, 2 pages.

VMware, Inc., "OVF, Open Virtual Machine Format Specification, version 0.9," White Paper, <http://www.vmware.com>, 2007, 50 pages.

VMware, Inc., "The Open Virtual Machine Format Whitepaper for OVF Specification, version 0.9," White Paper, <http://www.vmware.com>, 2007, 16 pages.

VMware, Inc., "Understanding VMware Consolidated Backup," White Paper, <http://www.vmware.com>, 2007, 11 pages.

VMware, Inc., "Using VMware Infrastructure for Backup and Restore," Best Practices, <http://www.vmware.com>, 2006, 20 pages.

VMware, Inc., "Virtual Disk API Programming Guide," <http://www.vmware.com>, Revision 20080411, 2008, 44 pages.

VMware, Inc., "Virtual Disk Format 1.1," VMware Technical Note, <http://www.vmware.com>, Revision 20071113, Version 1.1, 2007, 18 pages.

VMware, Inc., "Virtual Machine Backup Guide, ESX Server 3.0.1 and VirtualCenter 2.0.1," <http://www.vmware.com>, updated Nov. 21, 2007, 74 pages.

VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.

VMware, Inc., "Virtualized iSCSI SANS: Flexible, Scalable Enterprise Storage for Virtual Infrastructures," White Paper, <http://www.vmware.com>, Mar. 2008, 13 pages.

VMware, Inc., "VMware Consolidated Backup, Improvements in Version 3.5," Information Guide, <http://www.vmware.com>, 2007, 11 pages.

VMware, Inc., "VMware Consolidated Backup," Product Datasheet, <http://www.vmware.com>, 2007, 2 pages.

VMware, Inc., "VMware ESX 3.5," Product Datasheet, <http://www.vmware.com>, 2008, 4 pages.

VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.

VMware, Inc., "VMware OVF Tool," Technical Note, <http://www.vmware.com>, 2007, 4 pages.

VMware, Inc., "VMware Workstation 5.0, Snapshots in a Linear Process," <http://www.vmware.com/support/ws5/doc/ws_preserve_sshot_linear.html>, internet accessed on Mar. 25, 2008, 1 page.

VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.

VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.

Wikipedia, "Cluster (file system)," <http://en.wikipedia.org/wiki/Cluster_%28file_system%29>, internet accessed Jul. 25, 2008, 1 page.

Wikipedia, "Cylinder-head-sector," <http://en.wikipedia.org/wiki/Cylinder-head-sector>, internet accessed Jul. 22, 2008, 6 pages.

Wikipedia, "File Allocation Table," <http://en.wikipedia.org/wiki/File_Allocation_Table>, internet accessed on Jul. 25, 2008, 19 pages.

Wikipedia, "Logical Disk Manager," <http://en.wikipedia.org/wiki/Logical_Disk_Manager>, internet accessed Mar. 26, 2008, 3 pages.

Wikipedia, "Logical Volume Management," <http://en.wikipedia.org/wiki/Logical_volume_management>, internet accessed on Mar. 26, 2008, 5 pages.

Wikipedia, "Storage Area Network," <http://en.wikipedia.org/wiki/Storage_area_network>, internet accessed on Oct. 24, 2008, 5 pages.

Wikipedia, "Virtualization," <http://en.wikipedia.org/wiki/Virtualization>, internet accessed Mar. 18, 2008, 7 pages.

\* cited by examiner

| Block Identifier | Substantially Unique Identifier |
|---|---|
| 490 | 0xA1B3FG |
| 491 | 0xFG329A |
| 492 | 0xC1D839 |
| ... | |

*FIG. 17*

SYSTEMS AND METHODS FOR MANAGEMENT OF VIRTUALIZATION DATA

CROSS-REFERENCE TO RELATED APPLICATIONS

This application is a divisional of U.S. patent application Ser. No. 12/553,294 filed Sep. 3, 2009 (entitled SYSTEMS AND METHODS FOR MANAGEMENT OF VIRTUALIZATION DATA) which claims priority to U.S. Provisional Patent Application No. 61/094,753 filed Sep. 5, 2008 (entitled SYSTEMS AND METHODS FOR MANAGEMENT OF VIRTUALIZATION DATA), U.S. Provisional Patent Application No. 61/121,383 filed Dec. 10, 2008 (entitled SYSTEMS AND METHODS FOR MANAGEMENT OF VIRTUALIZATION DATA) and U.S. Provisional Patent Application No. 61/169,515 filed Apr. 15, 2009 (entitled SYSTEMS AND METHODS FOR MANAGEMENT OF VIRTUALIZATION DATA), each of which is incorporated by reference herein in its entirety.

BACKGROUND

In general, virtualization refers to the simultaneous hosting of one or more operating systems on a physical computer. Such virtual operating systems and their associated virtual resources are called virtual machines. Virtualization software sits between the virtual machines and the hardware of the physical computer. One example of virtualization software is ESX Server, by VMware, Inc. of Palo Alto, Calif. Other examples include Microsoft Virtual Server and Microsoft Windows Server Hyper-V, both by Microsoft Corporation of Redmond, Wash., and Sun xVM by Sun Microsystems Inc. of Santa Clara, Calif.

Virtualization software provides to each virtual operating system virtual resources, such as a virtual processor, virtual memory, a virtual network device, and a virtual disk. Each virtual machine has one or more virtual disks. Virtualization software typically stores the data of virtual disks in files on the filesystem of the physical computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Traditionally, virtualization software vendors have enabled the backup of virtual machine data in one of two ways. A first method requires the installation of backup software on each virtual machine having data to be backed up and typically uses the same methods used to back up the data of physical computers to back up the virtual machine data. A second method backs up the files that store the virtual disks of the virtual machines, and may or may not require the installation of backup software on each virtual machine for which the data is to be backed up.

As an example of the second method, VMware Consolidated Backup (VCB), also by VMware, Inc., enables the backup of the data of virtual machines on ESX Server without having to install backup software on the virtual machines. VCB consists of a set of utilities and scripts that work in conjunction with third-party backup software to backup virtual machine data. VCB and the third-party backup software are typically installed on a backup proxy server that uses the Microsoft Windows Server 2003 operating system by Microsoft Corporation. VCB supports file-level backups (backups at the level of files and directories) for virtual machines using Microsoft Windows operating systems. In a file-level backup, the granularity of the backup is at the level of individual files and/or directories of the virtual machine. A file-level backup allows copies of individual files on virtual disks to be made. File-level backups can be full backups, differential backups, or incremental backups.

VCB also supports image-level backups for virtual machines using any operating system (e.g., Microsoft Windows operating systems, Linux operating systems, or other operating systems that may be installed upon ESX Server). In an image-level backup, the granularity of the backup is at the level of a virtual machine (i.e., the entire virtual machine, including its current state is backed up). For an image-level backup, typically the virtual machine is suspended and all virtual disk and configuration files associated with the virtual machine are backed up, and then the virtual machine is resumed.

An administrator would typically choose to perform a file-level backup of a Microsoft Windows virtual machine because of the potential need to restore individual files or directories from the backed-up Microsoft virtual machine. However, VCB may not perform a file-level backup of a Microsoft Windows virtual machine as quickly as an image-level backup. Accordingly, a system that enables a backup of a Microsoft Windows virtual machine to be performed at least as quickly as a file-level backup and enables granular restoration of any data (e.g., individual files or directories) from the backed-up Microsoft virtual machine would have significant utility.

Because VCB only supports file-level backups for virtual machines using Microsoft Windows operating systems, a file-level backup cannot be performed using VCB for virtual machines using operating systems other than Microsoft Windows (e.g., Linux operating systems). An administrator must back up a non-Microsoft Windows virtual machine using an image-level backup. Therefore, in order to granularly restore data (e.g., an individual file or directory) from the backed-up non-Microsoft Windows virtual machine, the entire non-Microsoft Windows virtual machine must be restored. This may require overwriting the original virtual machine with the backed-up virtual machine, or re-creating the original virtual machine on a different physical machine. This may be a laborious and time-intensive process, and may result in loss of virtual machine data. Accordingly, a system that enables the granular restoration of any data (e.g., individual files or directories) within a virtual machine using any type of operating system would have significant utility.

Another challenge posed by the use of VCB to perform backups of virtual machines is that such backups require an administrator to manually identify or specify the virtual machines that are to be backed up, typically via a script created in advance of the backup operation. However, because virtual machines may be easily set up and torn down, virtual machines may be less permanent in nature than actual physical machines. Due to this potential transience of virtual machines, it may be more difficult for the administrator to identify all of the virtual machines which are to be backed up in advance of the backup operation. Accordingly, a system that provides automatic identification of virtual machines that are to be backed up at the time of the backup operation would have significant utility.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 17 is a diagram illustrating a suitable data structure that may be employed by aspects of the invention.

DETAILED DESCRIPTION

Figure 1A:
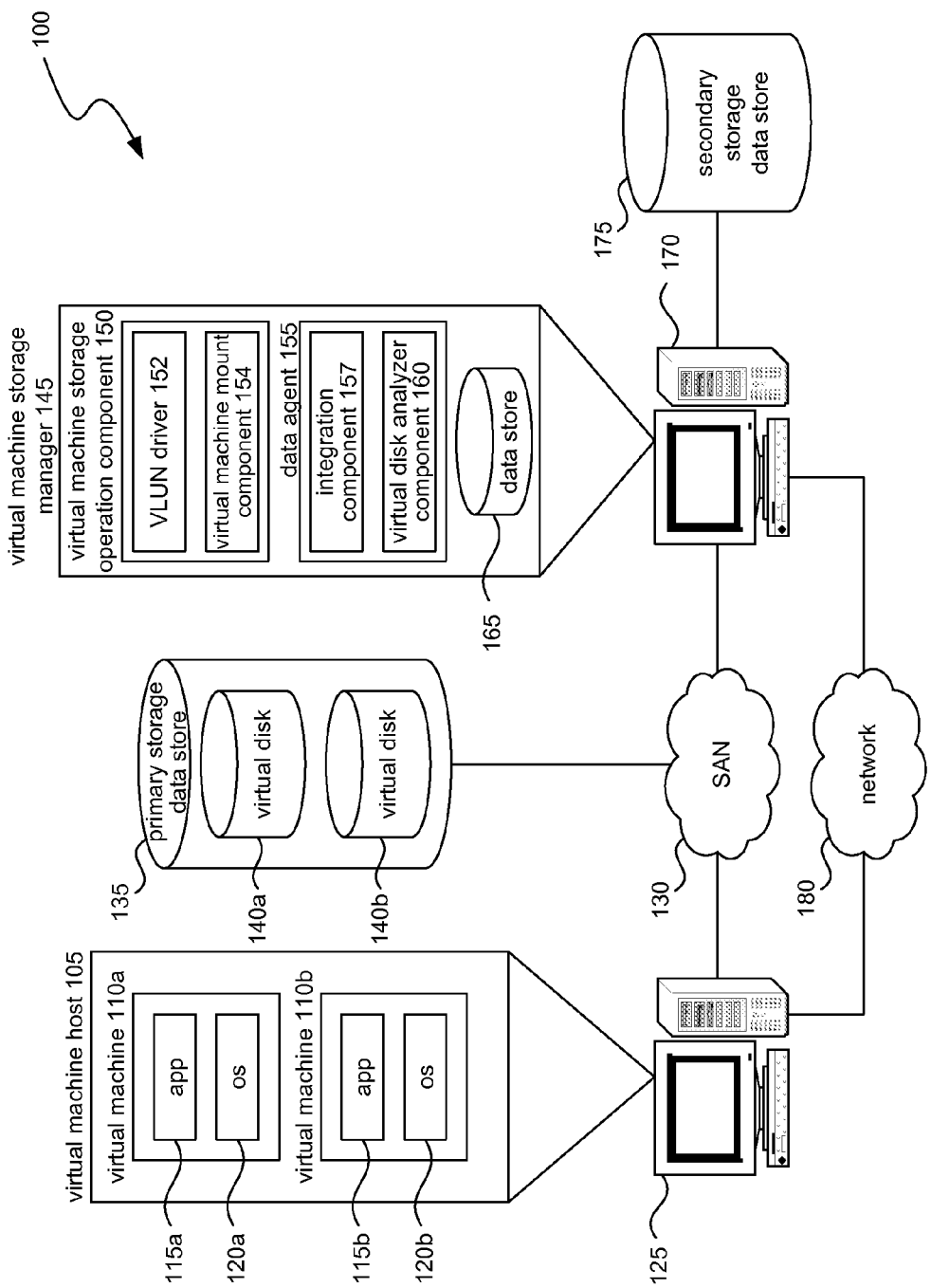
FIGS. 1A and 1B are block diagrams illustrating environments in which aspects of the invention may be configured to operate.

The headings provided herein are for convenience only and do not necessarily affect the scope or meaning of the claimed invention.

Overview

Described in detail herein is a method of copying data of one or more virtual machines being hosted by one or more non-virtual machines. The method includes receiving an indication that specifies how to perform a copy of data of one or more virtual machines hosted by one or more virtual machine hosts. The method further includes determining whether the one or more virtual machines are managed by a virtual machine manager that manages or facilitates management of the virtual machines. If so, the virtual machine manager is dynamically queried to automatically determine the virtual machines that it manages or that it facilitates management of. If not, a virtual machine host is dynamically queried to automatically determine the virtual machines that it hosts. The data of each virtual machine is then copied according to the specifications of the received indication.

Under one example of the method, a file-level, volume-level or disk-level copy of a virtual machine is performed. Performing a file-level copy involves determining volumes of the virtual machine, mounting the volumes on a proxy server, and copying files from the volumes mounted on the proxy server to a secondary storage data store. Performing a volume-level copy involves determining volumes of the virtual machine, mounting the volumes on a proxy server, and copying the volumes mounted on the proxy server to the secondary storage data store. Performing a disk-level copy involves determining virtual disk and configuration files of the virtual machine, copying the virtual disk and configuration files to the proxy server, extracting metadata from the virtual disk and configuration files, and copying the virtual disk and configuration files and the extracted metadata to the secondary storage data store.

Various examples of aspects of the invention will now be described. The following description provides specific details for a thorough understanding and enabling description of these examples. One skilled in the relevant art will understand, however, that aspects of the invention may be practiced without many of these details. Likewise, one skilled in the relevant art will also understand that aspects of the invention may have many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of aspects of the invention. Indeed, certain terms may even be emphasized below; however, any terminology intended to be interpreted in any restricted manner will be overtly and specifically defined as such in this Detailed Description section.

Unless described otherwise below, aspects of the invention may be practiced with conventional data processing systems. Thus, the construction and operation of the various blocks shown in FIGS. 1A, 1B and 2 may be of conventional design, and need not be described in further detail herein to make and use aspects of the invention, because such blocks will be understood by those skilled in the relevant art. One skilled in the relevant art can readily make any modifications necessary to the blocks in FIGS. 1A, 1B and 2 (or other embodiments or figures) based on the detailed description provided herein.

Figure 1B:
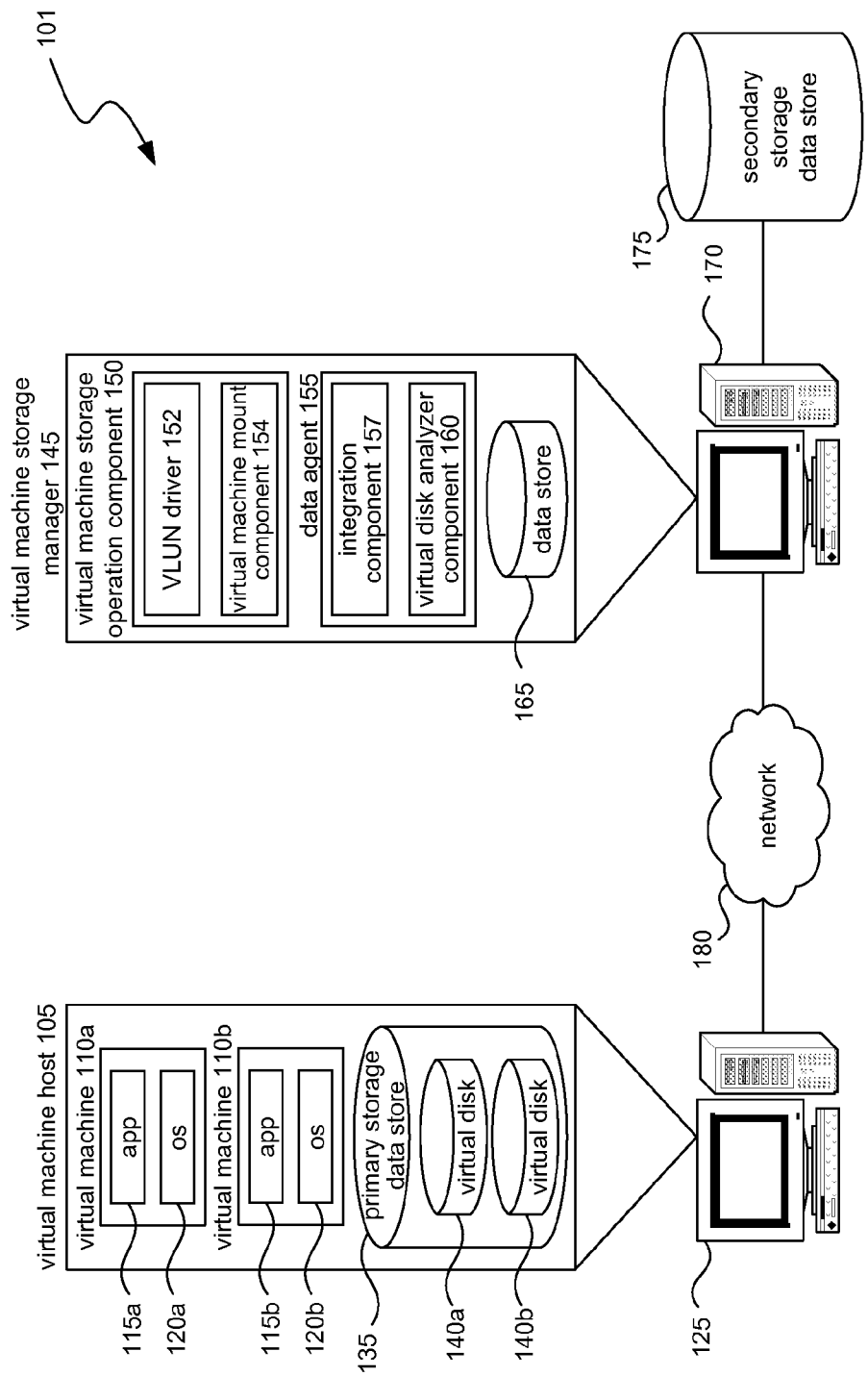
Figure 2:
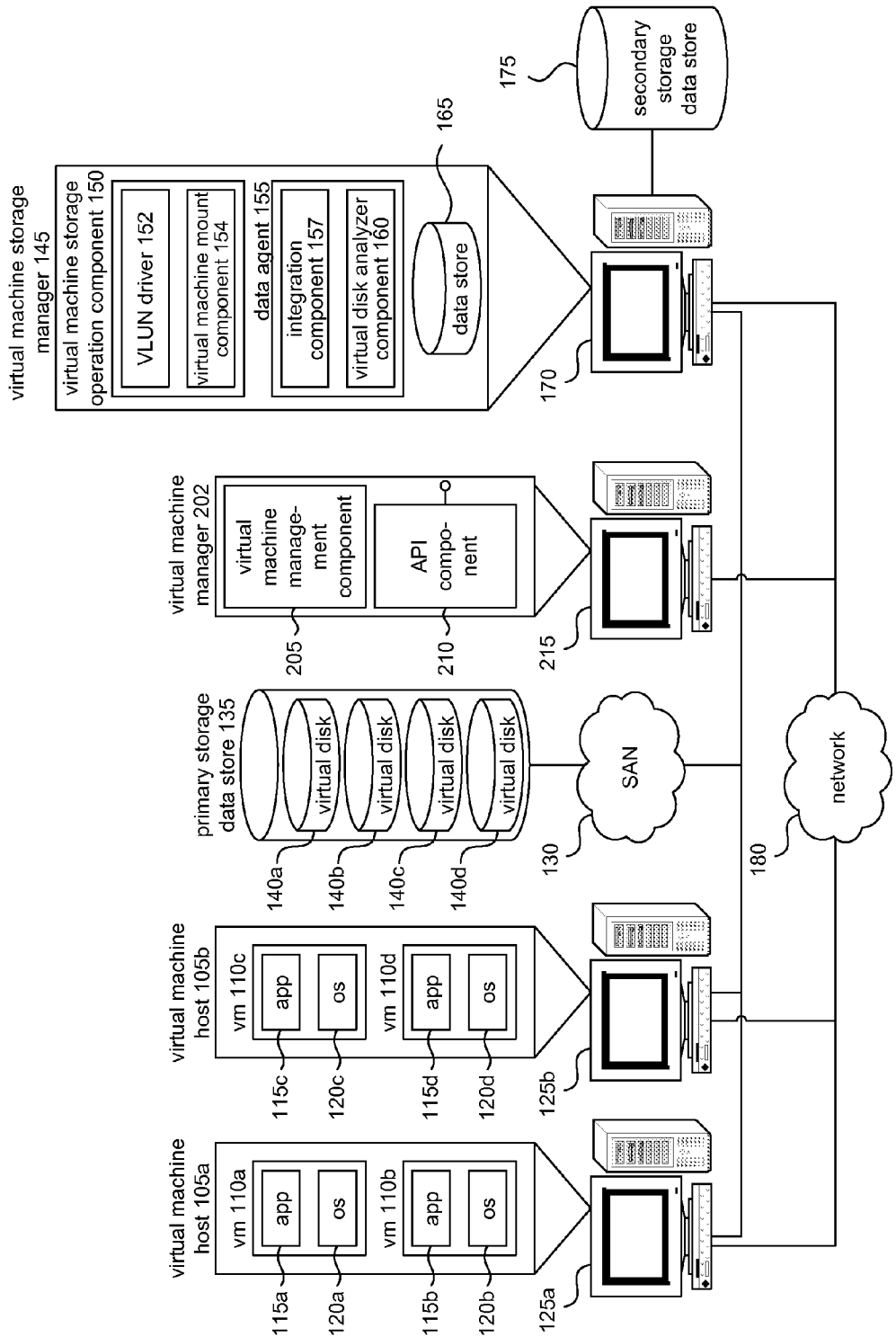
FIG. 2 is a block diagram illustrating another environment in which aspects of the invention may be configured to operate.
Figure 3:
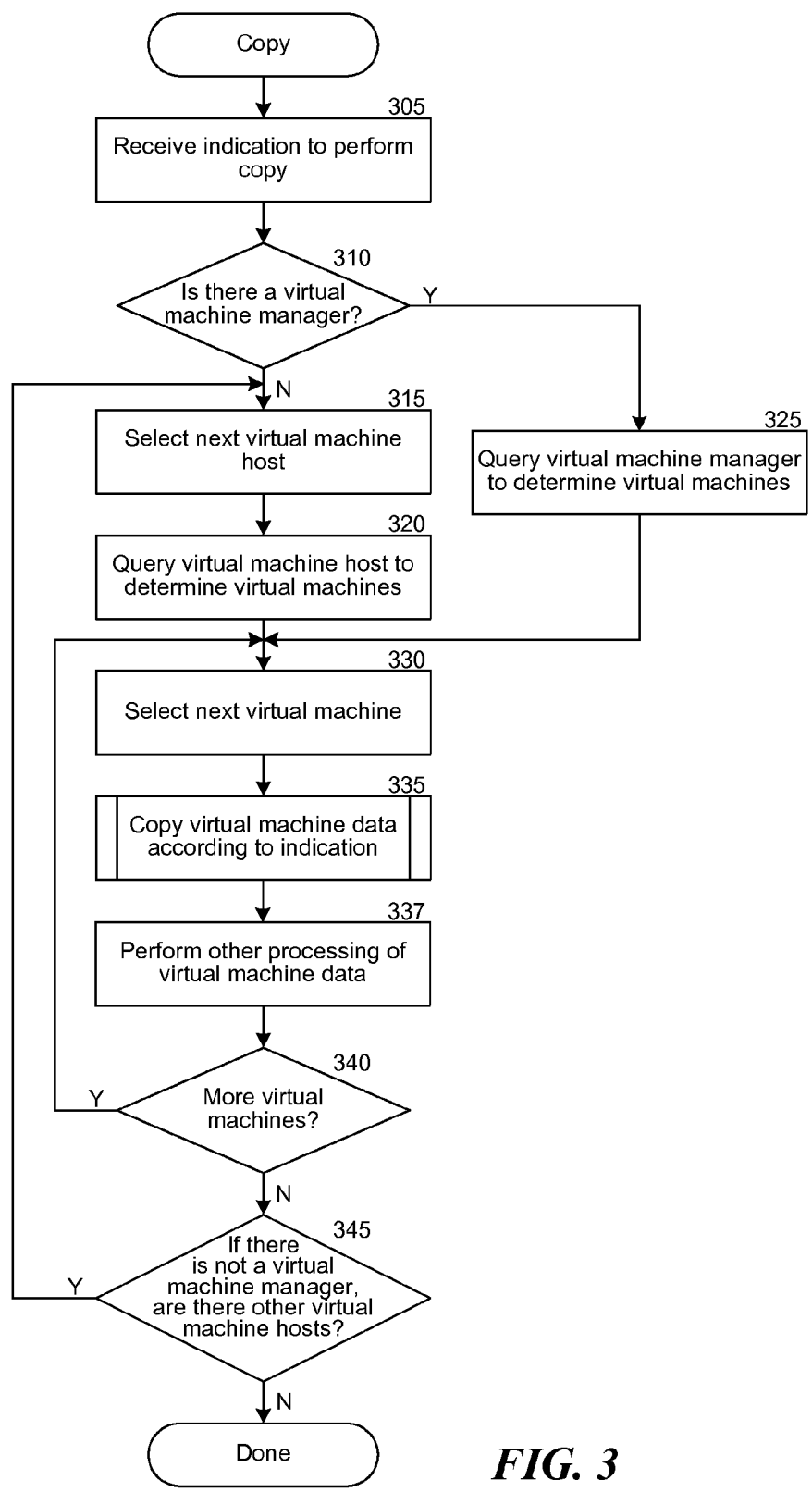
FIG. 3 is a flow diagram illustrating a process for discovering one or more virtual machines.

Aspects of the invention will now be described in detail with respect to FIGS. 1 through 17. FIGS. 1A, 1B and 2 are block diagrams illustrating various environments in which aspects of the invention may be configured to operate. FIG. 1A illustrates aspects of the invention interacting with virtual machines (e.g., VMware virtual machines or Microsoft virtual machines) storing data on a storage device connected to the virtual machine via a Storage Area Network (SAN), and FIG. 1B illustrates aspects of the invention interacting with virtual machines storing data locally. FIG. 2 illustrates aspects of the invention interacting with a virtual machine manager (e.g., a VMware Virtual Center server or a Microsoft System Center Virtual Machine Manager), which manages virtual machines. FIG. 3 is a flow diagram illustrating a process for discovering one or more virtual machines in one or more of the environments illustrated in FIGS. 1A, 1B and 2 (or in other environments).

Figure 4:
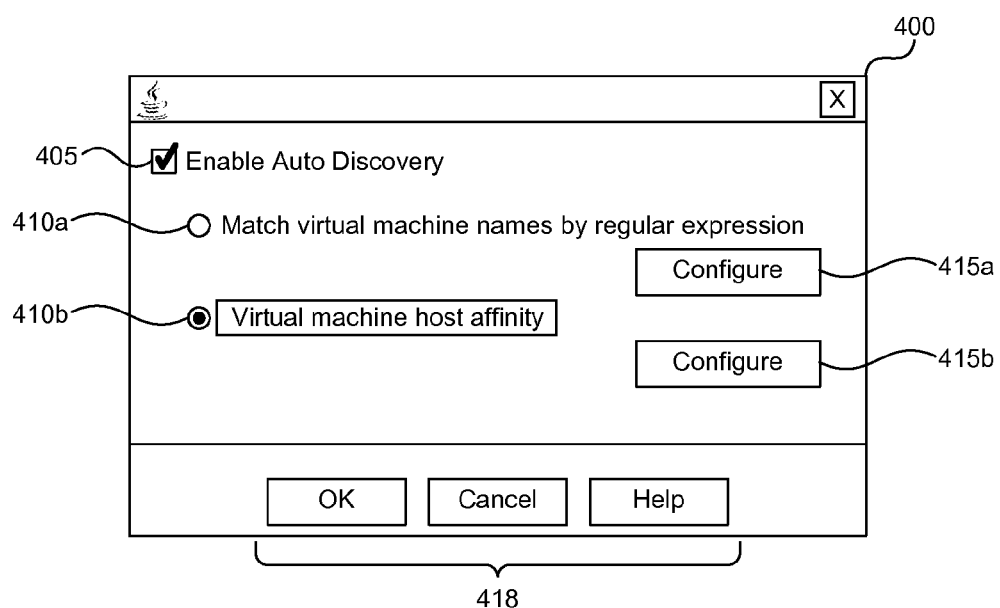
FIGS. 4-6 are display diagrams illustrating example interfaces provided by aspects of the invention.
Figure 5A:
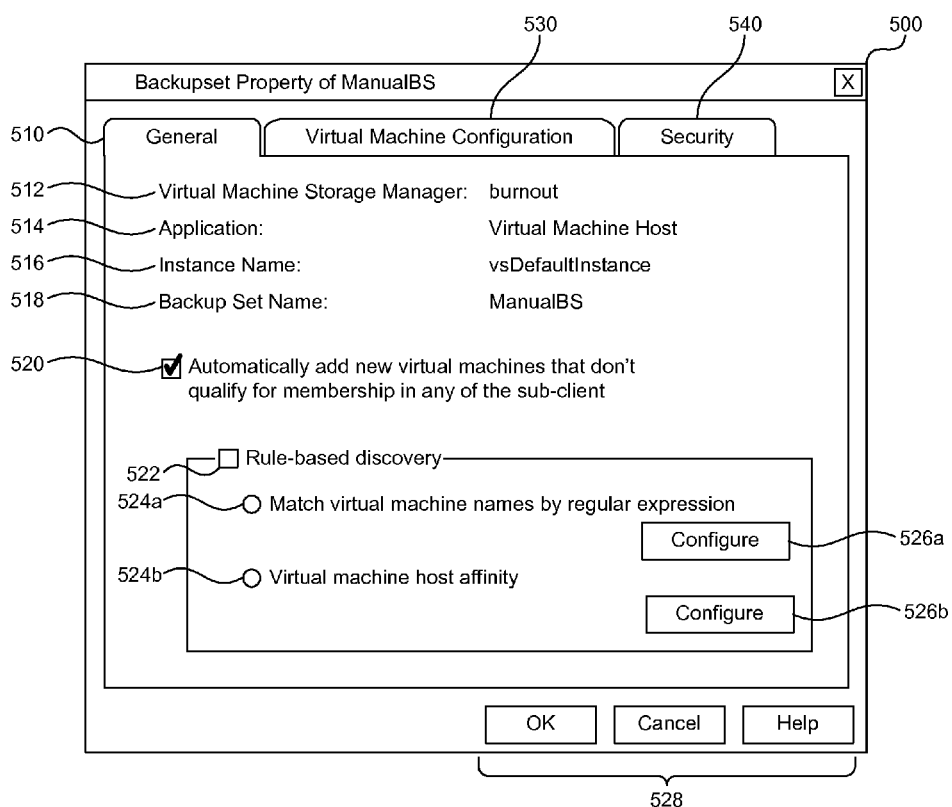
Figure 5B:
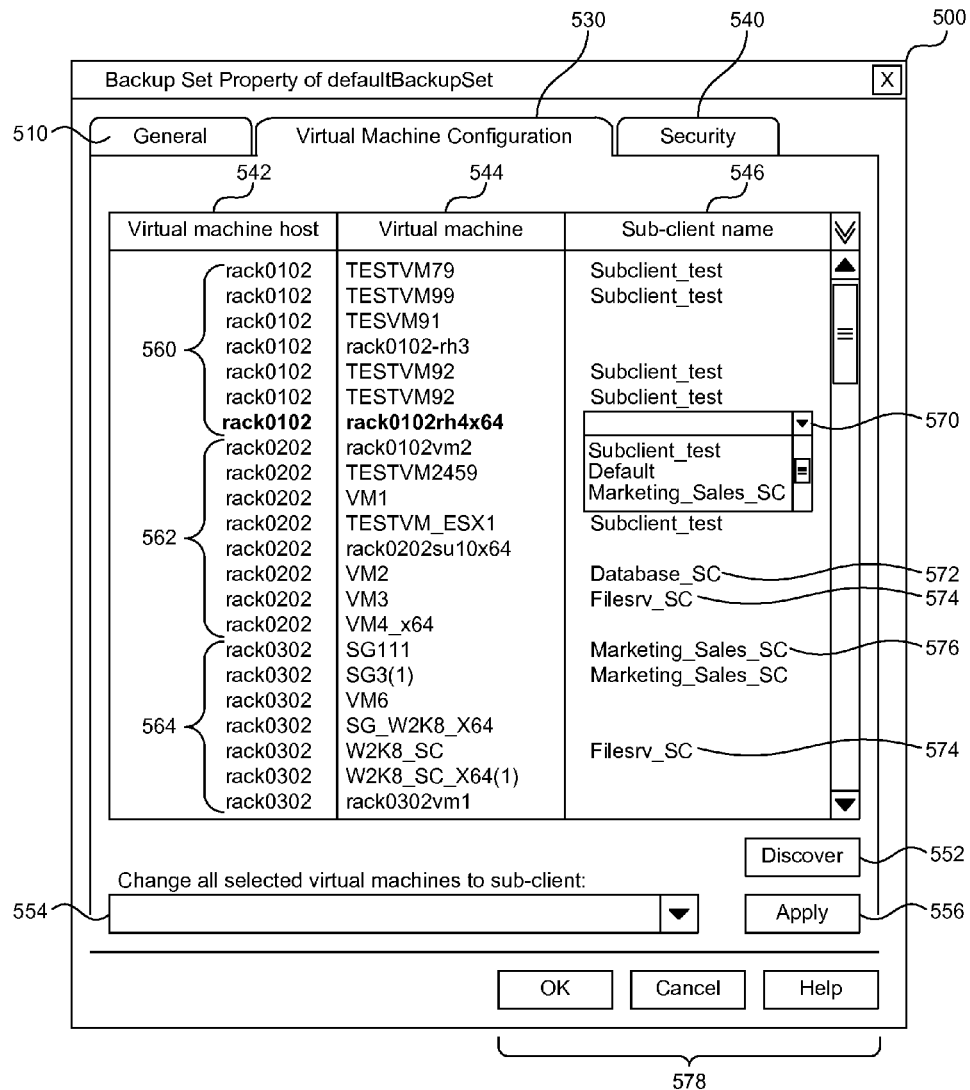
Figure 6:
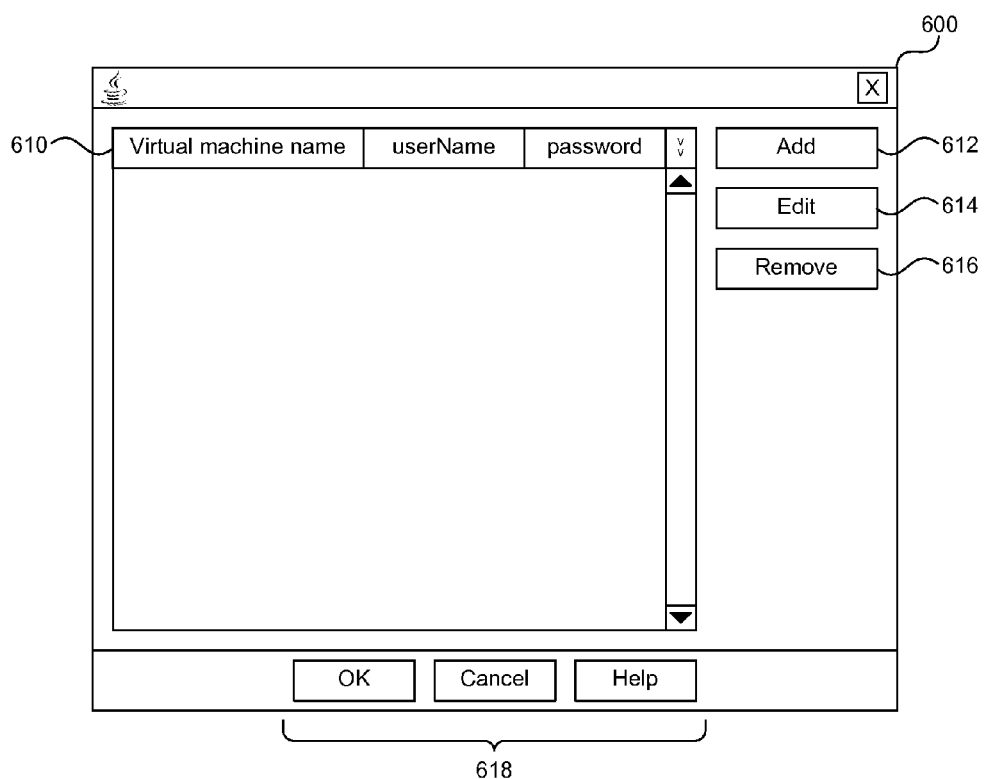
Figure 7:
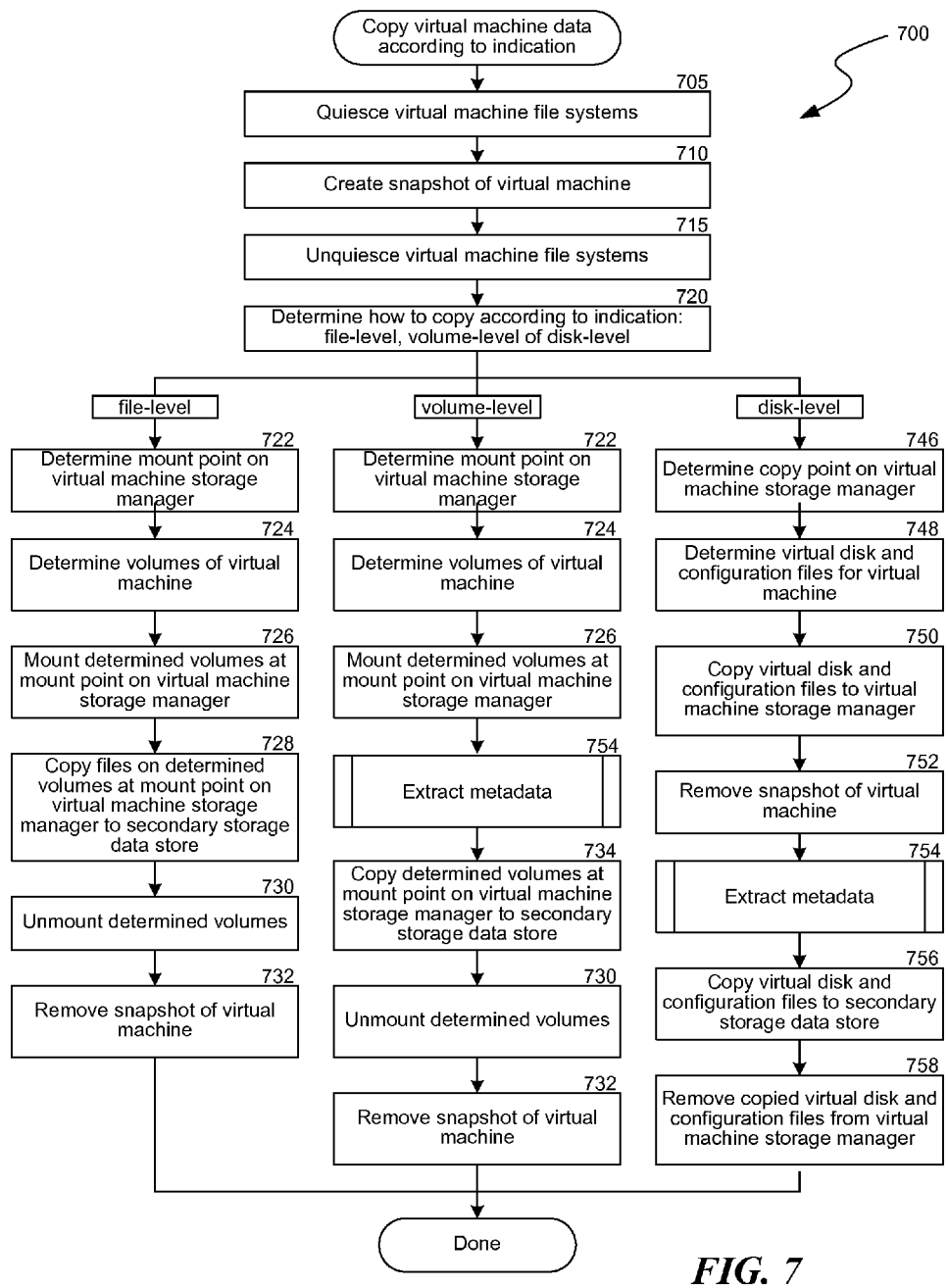
FIG. 7 is a flow diagram illustrating a process for copying virtual machine data.
Figure 8:
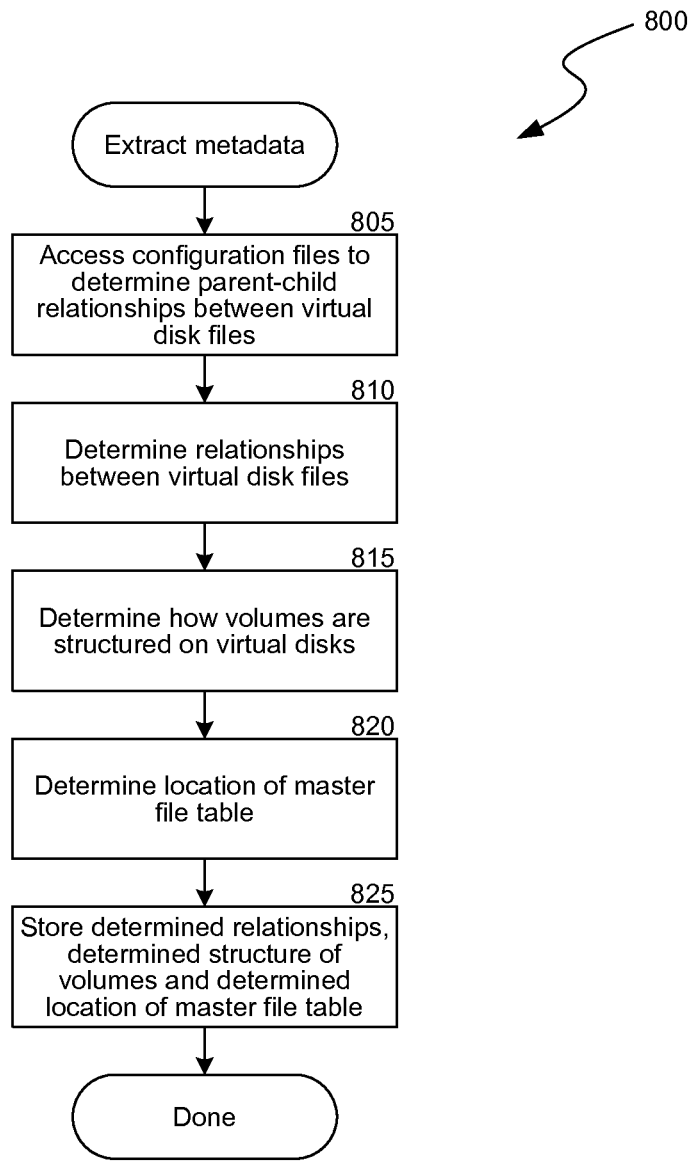
FIG. 8 is a flow diagram illustrating a process for extracting metadata from virtual volumes and/or virtual disk and configuration files.
Figure 9:
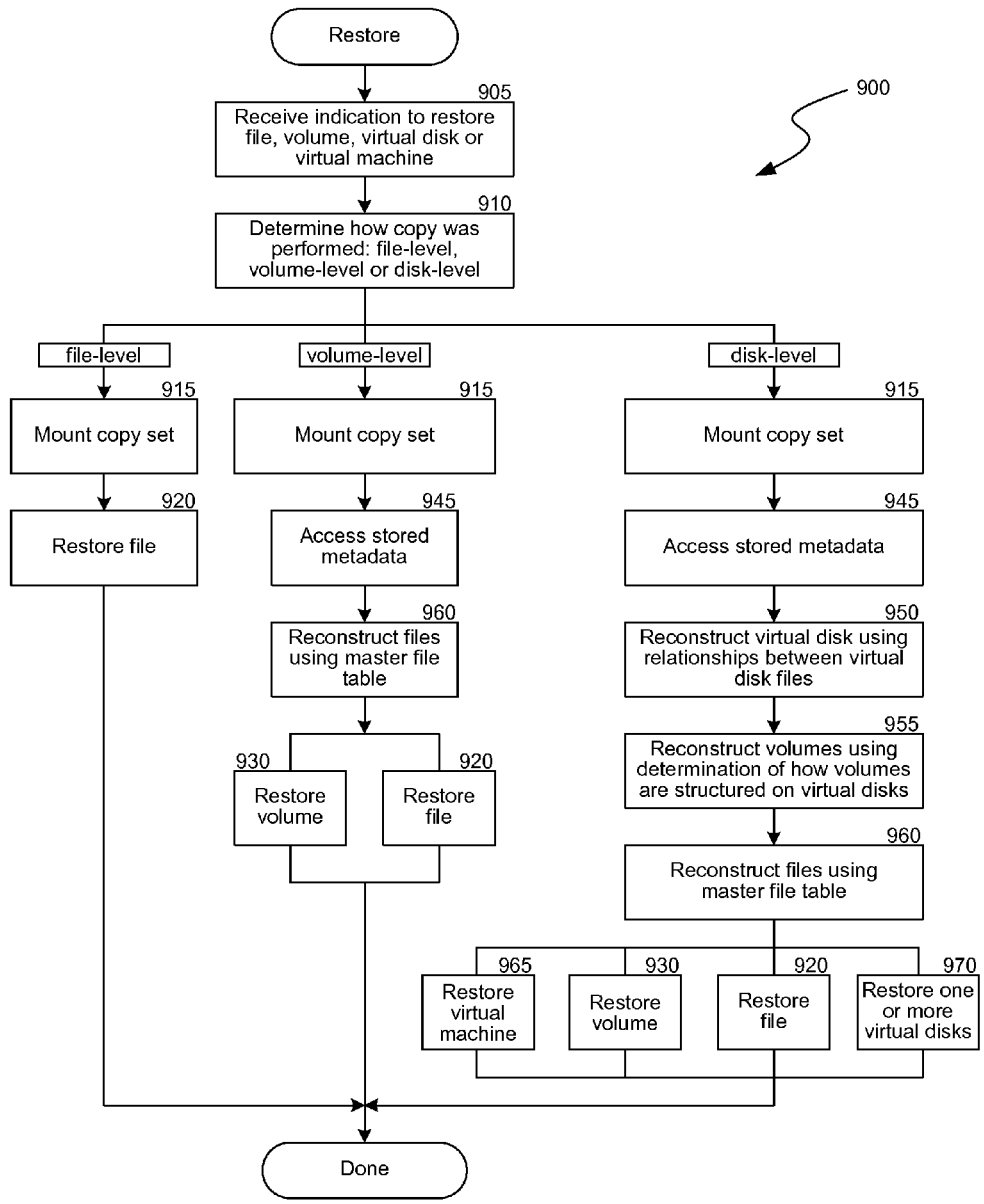
FIG. 9 is a flow diagram illustrating a process for restoring virtual machine data.
Figure 10:
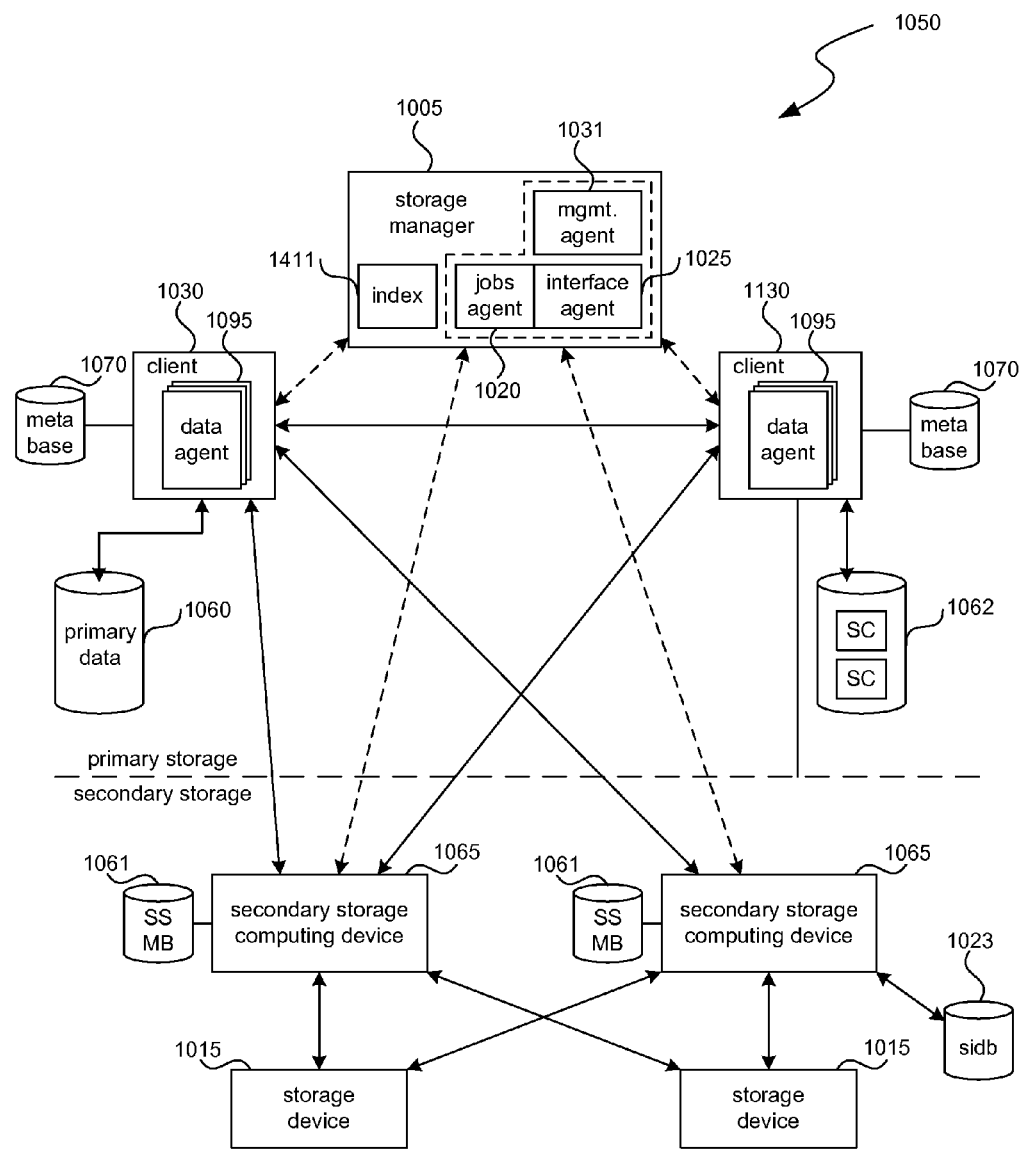
FIG. 10 is a block diagram illustrating an example of a data storage enterprise that may employ aspects of the invention.

FIGS. 4-6 are display diagrams illustrating example interfaces provided by aspects of the invention. An administrator (or other user) may use the example interfaces to administer storage operations, such as the copying of data of virtual machines. FIG. 7 is a flow diagram illustrating a process used by aspects of the invention to copy data of a virtual machine. FIG. 8 is a flow diagram illustrating a process for extracting metadata from virtual volumes and/or virtual disk and configuration files. FIG. 9 is a flow diagram illustrating a process for restoring virtual machine data. FIG. 10 is a block diagram illustrating an example of a data storage enterprise in which aspects of the invention may be configured to operate.

Figure 16:
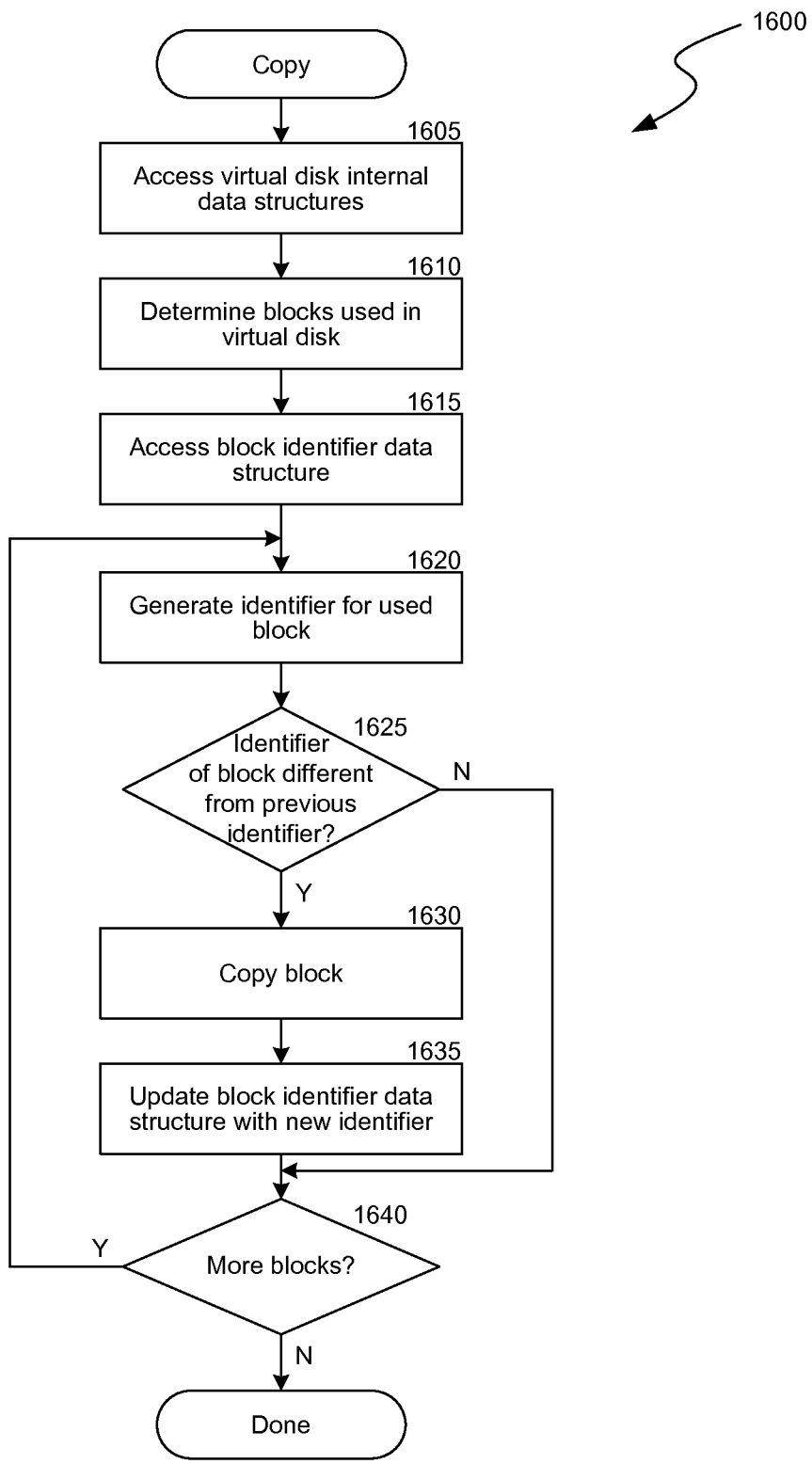
FIG. 16 is a flow diagram illustrating a process for copying virtual machine data.
Figure 17:
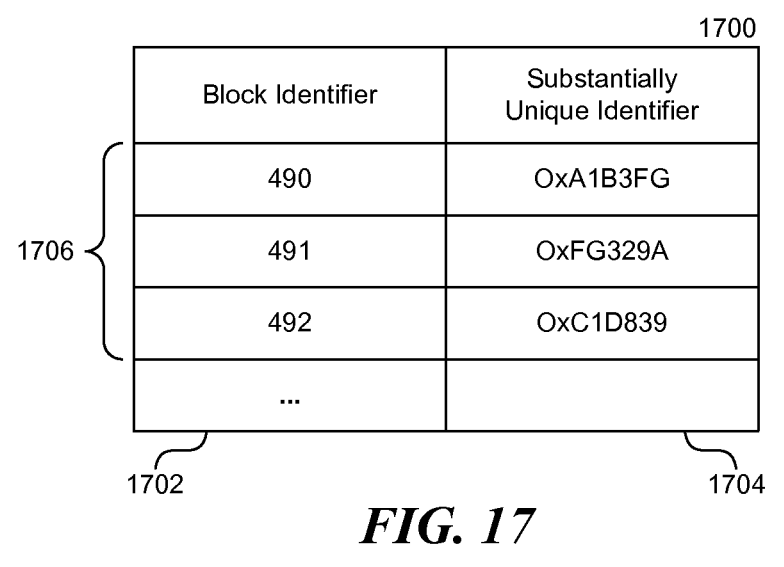

FIGS. 11, 12, 13A, 13B, 14A, and 14B are display diagrams illustrating example interfaces provided by aspects of the invention. The administrator may also use these example interfaces to administer storage operations, such as the restoration of data previously copied from virtual machines. FIG. 16 is a flow diagram illustrating a process that may be used in a storage operation to perform incremental copies of blocks of virtual machine data. FIG. 17 is a diagram illustrating a suitable data structure that may be used during the process of FIG. 16.

Suitable Environments

FIGS. 1A, 1B and 2 and the discussion herein provide a brief, general description of certain exemplary suitable computing environments in which aspects of the invention can be implemented. Although not required, aspects of the invention are described in the general context of computer-executable instructions, such as routines executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of wireless devices, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above or similar devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), a Wide Area Network (WAN), a SAN, a Fibre Channel network, or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other tangible or physical data storage media. In some aspects of the system, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of aspects of the invention may reside on a server computer, while corresponding portions reside on a client computer such as a mobile or portable device, and thus, while certain hardware platforms are described herein, aspects of the invention are equally applicable to nodes on a network.

FIG. 1A is a block diagram illustrating an environment 100 in which aspects of the invention may be configured to operate. The environment 100 includes a virtual machine host 105 operating on or being hosted by a computing device 125, which may be a server. The environment 100 also includes a primary storage data store 135 connected to the computing device 125 via a SAN 130. The environment 100 also includes a virtual machine storage manager 145 operating on or being hosted by another computing device 170, which may be another server, and a secondary storage data store 175 connected to the computing device 170. The computing devices 125 and 170 are connected to each other via a network 180, which may be a LAN, a WAN, the public Internet, some other type of network, or some combination of the above.

The virtual machine host 105 hosts one or more virtual machines 110 (shown individually as virtual machines 110a and 110b). Each virtual machine 110 has its own operating system 120 (shown individually as operating systems 120a and 120b) and one or more applications 115 executing on the operating system or loaded on the operating system (shown individually as applications 115a and 115b). The operating systems 120 may be any type of operating system 120 (e.g., Microsoft Windows 95/98/NT/2000/XP/2003/2008, Linux operating systems, Sun Solaris operating systems, UNIX operating systems, etc.) that can be hosted by the virtual machine host 105. The applications 115 may be any applications (e.g., database applications, file server applications mail server applications, web server applications, transaction processing applications, etc.) that may run on the operating systems 120. The virtual machines 110 are also connected to the network 180.

The computing device 125 is connected to the primary storage data store 135 via the SAN 130, which may be any type of SAN (e.g., a Fibre Channel SAN, an iSCSI SAN, or any other type of SAN). The primary storage data store 135 stores the virtual disks 140 (shown individually as virtual disks 140a and 140b) of the virtual machines 110 hosted by the virtual machine host 105. Virtual disk 140a is used by virtual machine 110a, and virtual disk 140b is used by virtual machine 110b. Although each virtual machine 110 is shown with only one virtual disk 140, each virtual machine 110 may have more than one virtual disk 140 in the primary storage data store 135. As described in more detail herein, a virtual disk 140 corresponds to one or more files (e.g., one or more *.vmdk or *.vhd files) on the primary storage data store 135. The primary storage data store 135 stores a primary copy of the data of the virtual machines 110. Additionally or alternatively, the virtual disks 140 may be stored by other storage devices in the environment 100.

A primary copy of data generally includes a production copy or other "live" version of the data that is used by a software application and is generally in the native format of that application. Primary copy data may be maintained in a local memory or other high-speed storage device (e.g., on the virtual disks 140 located in the primary storage data store 135) that allows for relatively fast data access if necessary. Such primary copy data may be intended for short-term retention (e.g., several hours or days) before some or all of the data is stored as one or more secondary copies, for example, to prevent loss of data in the event a problem occurs with the data stored in primary storage.

In contrast, secondary copies include point-in-time data and are typically intended for long-term retention (e.g., weeks, months, or years depending on retention criteria, for example, as specified in a storage or retention policy) before some or all of the data is moved to other storage or discarded. Secondary copies may be indexed so users can browse and restore the data at another point in time. After certain primary copy data is backed up, a pointer or other location indicia, such as a stub, may be placed in the primary copy to indicate the current location of that data. The secondary storage data store 175 stores one or more secondary copies of the data of the virtual machines 110.

The virtual machine storage manager 145 includes a virtual machine storage operation component 150, which includes a Virtual Logical Unit Number (VLUN) driver 152 (for accessing virtual disks 140, described in more detail herein) and a virtual machine mount component 154 (for mounting virtual machines, described in more detail herein). The virtual machine storage manager 145 also includes a data agent 155. The data agent 155 includes an integration component 157 that provides functionality for the virtual machine storage operation component 150. The data agent 155 also includes a virtual disk analyzer component 160 that examines the virtual disk and configuration files corresponding to the virtual disks 140 and extracts metadata from the virtual disk and configuration files. For example, the integration component 157 may include a set of scripts that the data agent 155 causes to be run prior to, during, and/or following a copy of virtual machine data. As another example, the integration component 157 may be a component that encapsulates or wraps the virtual machine mount component 154 and provides an Application Programming Interface (API) with functions for accessing the virtual machine mount component 154. The virtual machine storage manager 145 also includes a data store 165 that maintains data used by the virtual machine storage manager 145, such as data used during storage operations, and configuration data.

The secondary storage data store 175 is connected to the computing device 170. The secondary storage data store 175 may be any type of storage suitable for storing one or more secondary copies of data, such as Directly-Attached Storage (DAS) such as hard disks, storage devices connected via another SAN (e.g., a Fibre Channel SAN, an iSCSI SAN, or any other type of SAN), Network-Attached Storage (NAS), a tape library, optical storage, or any other type of storage. The secondary storage data store 175 stores virtual machine data that is copied by the virtual machine storage manager 145. Accordingly, the secondary storage data store 175 stores one or more secondary copies, of the data of the virtual machines 110. A secondary copy can be in one or more various formats (e.g., a copy set, a backup set, an archival set, a migration set, etc.).

FIG. 1B is a block diagram illustrating another environment 101 in which aspects of the invention may be configured to operate. The environment 101 is substantially the same as the environment 100 illustrated in FIG. 1A, except that primary storage data store 135 resides in the computing device 125 hosting the virtual machine host 105 (the primary storage data store 135 is local storage). The local primary storage data store 135 includes a virtual disk 140*a* for use by virtual machine 110*a*, and a virtual disk 140*b* for use by virtual machine 110*b*. In addition to or as an alternative to the primary storage data stores 135 illustrated in FIGS. 1A and 1B, the virtual machine host 105 may use other methods of storing data, such as Raw Device Mapping (RDM) on a local or network-attached device (NAS) or on storage devices connected via another SAN.

FIG. 2 is a block diagram illustrating yet another environment 200 in which aspects of the invention may be configured to operate. The environment 200 includes two computing devices 125 (shown individually as computing devices 125*a* and 125*b*), each hosting a virtual machine host 105 (shown individually as virtual machine hosts 105*a* and 105*b*). The primary storage data store 135 includes two additional virtual disks 140*c* and 140*d* that store the data of virtual machines 110*c* and 110*d*, respectively.

The environment 200 also includes a virtual machine manager 202 operating on a computing device 215 (e.g., a server). The virtual machine manager 202 includes a virtual machine management component 205 which enables administrators (or other users with the appropriate permissions; the term administrator is used herein for brevity) to manage the virtual machines 110. The virtual machine manager 202 also includes an Application Programming Interface (API) component 210, which provides functions that enable the data agent 155 to programmatically interact with the virtual machine manager 202 and the virtual machines 110. The virtual machine hosts 105 may also each include an API component. The virtual machine manager 202 and/or the virtual machine hosts 105 may expose or provide other APIs not illustrated in FIG. 1A, 1B or 2, such as an API for accessing and manipulating virtual disks 140, and APIs for performing other functions related to management of virtual machines 110.

The environments 100, 101 and 200 may include components other than those illustrated in FIGS. 1A, 1B and 2, respectively, and the components illustrated may perform functions other than or in addition to those described herein. For example, the virtual machine storage manager 145 may include a public key certificate (e.g., an X.509 public key certificate) that the virtual machine storage manager 145 provides to the virtual machine host 105 or the virtual machine manager 202. The virtual machine host 105 or the virtual machine manager 202 can then use the X.509 public key of the certificate to encrypt data that is to be transmitted to the virtual machine storage manager 145. As another example, the network 180 may include a firewall that sits between the virtual machine host 105 and the virtual machine storage manager 145, and data being copied may have to pass through the firewall. If this is the case, the virtual machine storage manager 145 may use the systems and methods described in commonly-assigned U.S. patent application Ser. No. 10/818,747 (entitled SYSTEM AND METHOD FOR PERFORMING STORAGE OPERATIONS THROUGH A FIREWALL), the entirety of which is incorporated by reference herein.

As another example, a secondary storage computing device (which is described in more detail herein, e.g., with reference to FIG. 10) may be connected to the virtual machine storage manager 145 and to the secondary storage data store 175. The secondary storage computing device may assist in the transfer of copy data from the virtual machine storage manager 145 to the secondary storage data store 175. The secondary storage computing device may perform functions such as encrypting, compressing, single or variable instancing, and/or indexing data that is transferred to the secondary storage data store 175. As another example, one or more agents (e.g., a file system agent and/or a proxy host agent) as well as a set of utilities (e.g., VMware Tools if the virtual machines 110 are VMware virtual machines) may reside on each virtual machine 110 to provide functionality associated with copying and restoring virtual machine data. As another example, the environments 100, 101 and 200 may include components or agents that perform various functions on virtual machine and other data, such as classifying data, indexing data, and single or variable instancing or deduplicating data at different phases of storage operations performed on virtual machine and other data.

As another example, the secondary storage data store 175 may include one or more single instance storage devices that store only a single instance of multiple instances of data (e.g., only a single instance of multiple instances of identical files or data objects stored on one or more computing devices). If this is the case, the secondary storage data store 175 may include one or more single instance storage devices as described in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS); 2) U.S. patent application Ser. No. 12/145,347 (entitled APPLICATION-AWARE AND REMOTE SINGLE INSTANCE DATA MANAGEMENT); or 3) U.S. patent application Ser. No. 12/145,342 (entitled APPLICATION-AWARE AND REMOTE SINGLE INSTANCE DATA MANAGEMENT), 4) U.S. patent application Ser. No. 11/963,623 (entitled SYSTEM AND METHOD FOR STORING REDUNDANT INFORMATION); 5) U.S. patent application Ser. No. 11/950,376 (entitled SYSTEMS AND METHODS FOR CREATING COPIES OF DATA SUCH AS ARCHIVE COPIES); or 6) U.S. Pat. App. No. 61/100,686 (entitled SYSTEMS AND METHODS FOR MANAGING SINGLE INSTANCING DATA), each of which is incorporated by reference herein in its entirety.

As a further example, the secondary storage data store 175 may include one or more variable instance storage devices that store a variable number of instances of data (e.g., a variable number of instances of identical files or data objects stored on one or more computing devices). If this is the case, the secondary storage data store 175 may include one or more variable instance storage devices as described in the following commonly-assigned U.S. Pat. App. No. 61/164,803 (entitled STORING A VARIABLE NUMBER OF INSTANCES OF DATA OBJECTS).

Example Layouts of Virtual Disks

Virtual disks 140, as used in the systems described in FIGS. 1A, 1B and 2, may have various configurations. As previously described, a virtual disk 140 corresponds to one or more virtual disk files (e.g., one or more *.vmdk or *.vhd files) on the primary storage datastore 135. A virtual machine host 105 may support several types of virtual disks 140. For example, a virtual disk 140 may be either: 1) a growable virtual disk 140 contained in a single virtual disk file that can grow in size (e.g., a monolithic sparse virtual disk that starts at 2 GB and grows larger); 2) a growable virtual disk 140 split into multiple virtual disk files (e.g., a split sparse virtual disk comprising multiple 2 GB virtual disk files), the aggregation of which can grow in size by adding new virtual disk files; 3) a preallocated virtual disk 140 contained in a single virtual disk file (e.g., a monolithic flat virtual disk, the size of which does not change); or 4) a preallocated virtual disk 140 split into multiple virtual disk files (e.g., a split flat virtual disk comprising multiple 2 GB virtual disk files, the number of which and the size of each of which does not change). Where a virtual disk 140 is split into multiple virtual disk files, each individual virtual disk file is called an extent. A virtual machine host 105 may also support types of virtual disks 140 other than these types. Those of skill in the art will understand that a virtual disk 140 can be structured in a wide variety of configurations, and that virtual disks 140 are not limited to the configurations described herein.

A virtual machine host 105 may support snapshotting, or taking a snapshot of a virtual machine 110. The virtual machine host 105 can snapshot a virtual machine 110 in a linear fashion (in which there is only one branch of snapshots from the original state of the virtual machine 110, and each snapshot in the branch linearly progresses from prior snapshots) or in a process tree (in which there are multiple branches of snapshots from the original state of the virtual machine 110, and two snapshots may or may not be in the same branch from the original state of the virtual machine 110). When a snapshot is taken of a virtual machine 110, the virtual machine 110 stops writing to its virtual disks 140 (e.g., stops writing to the one or more *.vmdk files). The virtual machine 110 writes future writes to a delta disk file (e.g., a *delta.vmdk file) using, for example, a copy-on-write (COW) semantic. As the virtual machine host 105 can snapshot a virtual machine 110 repeatedly, there can be multiple delta disk files. The virtual disk and delta disk files can be analogized to links in a chain. Using this analogy, the original disk file is a first link in the chain. A first child delta disk file is a second link in the chain, and a second child delta disk file is a third link in the chain, and so forth.

Also as previously described, a virtual machine 110 generally has associated configuration files that a virtual machine host 105 uses to store configuration data about the virtual machine 110. These configuration files may include a *.vmx file, which stores data about the parent-child relationships created between virtual disk files and delta disk files when a snapshot of a virtual machine 110 is taken. These configuration files may also include a disk descriptor file (e.g., a *.vmdk file). In some embodiments, instead of using a disk descriptor file, the disk descriptor is embedded into a virtual disk file (e.g., embedded in a *.vmdk file).

The disk descriptor file generally stores data about the virtual disk files that make up a virtual disk 140. This data includes information about the type of the virtual disk 140. For example, the virtual disk 140 may be a monolithic flat virtual disk, a monolithic sparse virtual disk, a split flat virtual disk, a split sparse virtual disk or another type of a virtual disk. This data also includes an identifier of the parent of the virtual disk file, if it has one (if the virtual machine 110 has been snapshotted, its original virtual disk file will have a child virtual disk file), a disk database describing geometry values for the virtual disk 140 (e.g., cylinders, heads and sectors) and information describing the extents that make up the virtual disk 140. Each extent may be described by a line in the disk descriptor file having the following format:

[type of access] [size] [type] [file name of extent]

Following is an example of a line in the disk descriptor file describing an extent:

RW 16777216 VMFS "test-flat.vmdk"

This line describes an extent for which read/write access is allowed, of size 16777216 sectors, of type VMFS (e.g., for use on a primary storage data store 135), and the filename of the virtual disk file—"test-flat.vmdk."

A virtual machine host 105 provides an abstraction layer such that the one or more virtual disks files (and any delta disk files) of the virtual disks 140 appear as one or more actual disks (e.g., one or more hard disk drives) to a virtual machine 110. Because the virtual machine host 105 abstracts the virtual disk 140 so that it appears as an actual disk to an operating system 120 executing on the virtual machine 110, the operating system 120 can generally use its standard file system for storing data on a virtual disk 140. The various structures used by the file system and the operating system 120 (e.g., the partition table(s), the volume manager database(s) and the file allocation table(s)) are stored in the one or more virtual disk files that make up a virtual disk 140.

For example, a virtual machine host 105 may store a single virtual disk file (e.g., a single *.vmdk file) that is a preallocated virtual disk 140 (a monolithic flat virtual disk) for each virtual disk used by a virtual machine 110 operating on the virtual machine host 105. The single virtual disk file may be named <virtual machine name>-flat.vmdk. There would also be a disk descriptor file for the single virtual disk file that would typically be named <virtual machine name>-.vmdk. A snapshot taken of the virtual machine 110 would result in an additional delta disk file being created that is a single virtual disk file (e.g., a single *.vmdk file), which is a growable virtual disk 140 (a monolithic sparse virtual disk). The delta disk file would typically be named <virtual disk name>-<######>-delta.vmdk, where <######> is a number indicating the sequence of the snapshot. There would also be a disk descriptor file for the single virtual disk file that would typically be named <virtual disk name>-<######>-.vmdk, again, where <######> is a number indicating the sequence of the snapshot.

Process for Discovering Virtual Machines

FIG. 3 is a flow diagram illustrating a process for discovering one or more virtual machines 110 (e.g., for an operation to copy their data). In general, for ease in describing features of the invention, aspects of the invention will now be described in terms of a user (e.g., an administrator) interacting with the server computer via his or her user computer. As implemented, however, the user computer receives data input by the user and transmits such input data to the server computer. The server computer then queries the database, retrieves requested pages, performs computations and/or provides output data back to the user computer, typically for visual display to the user. Thus, for example, under step 305, a user provides input specifying that a copy operation is to be performed and how to perform the copy operation. The data agent 155 receives this input and performs the copy operation according to the input.

The process 300 begins at step 305 when the data agent 155 receives an indication specifying that the data agent 155 is to perform a copy operation and how to perform the copy operation. The indication may be received from the administrator (e.g., a manually-specified indication to perform a copy operation) or be triggered automatically (e.g., by an automated schedule). The indication may be received as a result of a storage policy that specifies how and/or when to copy data from one or more virtual machines 110 to the secondary storage data store 175.

A storage policy is generally a data structure or other information source that includes a set of preferences and other storage criteria associated with performing a storage operation. The preferences and storage criteria may include, but are not limited to, a storage location, relationships between system components, network pathways to utilize in a storage operation, retention policies, data characteristics, compression or encryption requirements, preferred system components to utilize in a storage operation, a single-instancing or variable instancing policy to apply to the data, and other criteria relating to a storage operation. For example, a storage policy may indicate that certain data is to be stored in the secondary storage data store 175, retained for a specified period of time before being aged to another tier of secondary storage, copied to the secondary storage data store 175 using a specified number of data streams, etc. A storage policy may be stored in a database of a storage manager (see, e.g., FIG. 10 and accompanying description), to archive media as metadata for use in restore operations or other storage operations, or to other locations or components of the system. The storage manager may include a jobs agent that monitors the status of some or all storage operations previously performed, currently being performed, or scheduled to be performed.

For example, an administrator may create a storage policy for copying data of virtual machines 110 and perform the copying of their data to the secondary storage data store 175 according to the storage policy. This storage policy may specify that the virtual machine storage manager 145 is to perform a file-level copy of certain files (e.g., all files in a specific directory or satisfying selection criteria) on multiple virtual machines 110. As yet another example, the storage policy may specify that the virtual machine storage manager 145 is to perform a volume-level copy of all virtual machines 110 on multiple virtual machine hosts 105. As another example, the storage policy may specify that the virtual machine storage manager 145 is to perform a disk-level copy of all virtual machines 110 on all virtual machine hosts 105 associated with a virtual machine manager 202. File-level, volume-level and disk-level copying is discussed in more detail herein, for example, with reference to FIG. 7.

At decision step 310 the data agent 155 determines (e.g., by reading a stored indication of the virtual machine manager 202, or by scanning a network for a virtual machine manager 202) whether there is a virtual machine manager 202 managing the virtual machine hosts 105 and associated virtual machines 110. If there is a virtual machine manager 202, the process 300 continues at step 325, where the data agent 155 queries the virtual machine manager 202 to determine the virtual machines 110 that it manages and to receive an ordered or unordered list of virtual machines 110. The data agent 155 may call a function of the API component 210 to determine the virtual machines 110 managed by the virtual machine manager 202 and receive an ordered or unordered list of virtual machines 110.

If there is not a virtual machine manager 202, the process 300 continues at step 315, where the data agent 155 selects the next virtual machine host 105, which, on the first loop, is the first determined virtual machine host 105. The virtual machine hosts 105 may be dynamically determined (e.g., by scanning the network 180) or determined statically (e.g., by reading a stored indication of the virtual machine hosts 105). More details as to the detection of virtual machine hosts 105 and virtual machines 110 are described herein for example, with reference to FIGS. 4-6. The steps 325 and 320 are not to be understood as mutually exclusive. For example, the data agent 155 may determine a first set of virtual machines 110 by accessing the virtual machine manager 202, and a second set of virtual machines by accessing one or more virtual machine hosts 105.

At step 320 the data agent 155 queries the virtual machine host 105 to determine the virtual machines 110 that it hosts. The data agent 155 may call a function of the API component 210 to determine the virtual machines 110 hosted by the virtual machine host 105 and to receive an ordered or unordered list of virtual machines 110. At step 330, the data agent 155 begins looping through the list of virtual machines 110 that it determined in either or both of steps 320 or 325 and selects the next virtual machine 110 on the list, which, on the first loop, is the first determined virtual machine 110. At step 335 the data agent 155 copies the data of the virtual machine, for example, according to the indication received in step 305, or according to a storage policy. This process is described in more detail herein, for example, with reference to FIG. 7.

At step 337, other processing of virtual machine data may be performed. For example, the data agent 155 (or another agent, such as a data classification agent) may analyze and classify the virtual machine data. To do so, the data agent 155 may use techniques such as those described in commonly assigned U.S. patent application Ser. No. 11/564,119 (entitled SYSTEMS AND METHODS FOR CLASSIFYING AND TRANSFERRING INFORMATION IN A STORAGE NETWORK), the entirety of which is incorporated by reference herein. As another example, the data agent 155 (or another agent, such as an indexing agent) may create an index of the virtual machine data. To do so, the data agent 155 may use techniques such as those described in commonly-assigned U.S. patent application Ser. No. 11/694,869 (entitled METHOD AND SYSTEM FOR OFFLINE INDEXING OF CONTENT AND CLASSIFYING STORED DATA), the entirety of which is incorporated herein. As a final example, the data agent 155 may single or variable instance or de-duplicate the virtual machine data. To do so, the data agent 155 may use techniques described in one or more of previously-referenced U.S. patent application Ser. Nos. 11/269, 512, 12/145,347, 12/145,342, 11/963,623, 11/950,376, 61/100,686, and 61,164,803. At decision step 340, the data agent 155 determines whether there are more virtual machines 110 for which the data is to be copied. If so, the data agent 155 returns to step 330, where the next virtual machine 110 is selected.

If there are no more virtual machines 110 for which the data is to be copied (e.g., if the data agent 155 has looped through the list of all the virtual machines 110 determined in either or both of steps 320 or 325), the process continues at step 345. At decision step 345, if there is not a virtual machine manager 202 (e.g., as determined in decision step 310), the data agent 155 determines whether there are more virtual machine hosts 105 (e.g., if more than one virtual machine hosts 105 was specified in the indication received in step 305). If there are more virtual machine hosts 105, the data agent 155 returns to step 315. If not, the process 300 concludes.

Interfaces for Configuring Storage Operations for Virtual Machine Data

Referring to FIGS. 4 through 6, representative computer displays or web pages for configuring storage operations to be performed for virtual machine data will now be described. The screens of FIGS. 4 through 6 may be implemented in any of various ways, such as in C++ or as web pages in XML (Extensible Markup Language), HTML (Hyper Text Markup Language), or any other scripts or methods of creating displayable data, such as the Wireless Access Protocol ("WAP"). The screens or web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

FIG. 4 is a display diagram illustrating an example interface 400 provided by aspects of the invention. The interface 400 enables an administrator to specify options for the data agent 155 to discover virtual machines 110 for purposes of adding them to a sub-client. Clients and sub-clients are discussed in more detail with respect to FIGS. 5A and 5B. The administrator can specify that the data agent 155 is to automatically discover virtual machines 110 by selecting check box 405, which enables two options. The first option, which can be chosen by selecting radio button 410a and using the button 415a labeled "Configure," specifies that the data agent 155 is to discover virtual machine hosts 105 or virtual machines 110 that match a regular expression (e.g., an expression that describes a set of strings). The second option, which can be chosen by selecting radio button 410b and using the button 415b labeled "Configure," specifies that the data agent 155 is to discover virtual machines 110 associated with one or more specified virtual machine hosts 105. The two options allow the administrator to specify one or more criteria (e.g., based on names of the virtual machines 110) that discovered virtual machine 110 should meet in order to be associated with a storage policy, and this to have storage operations performed upon their data. Additionally or alternatively, data of virtual machines 110 can be classified or categorized (e.g., using techniques described in the previously referenced U.S. patent application Ser. No. 11/564,119) and the one or more criteria can use these classifications or categorizations. Detected virtual machines 110 that meet these one or more criteria (or having data that meets these one or more criteria) can be associated with a storage policy. This allows storage operations to be performed upon their data.

Buttons 418 enable the administrator to confirm or cancel the selections and/or view help regarding the interface 400. The interface 400 may enable discovery of virtual machines 110 by both regular expression matching and by association with one or more specified virtual machine hosts 105. For example, the interface 400 could be configured to discover all virtual machines 110 associated with a specific virtual machine host 105, as well as an additional number of virtual machines 110 having names that match a regular expression (e.g., "virtual/A").

FIG. 5A is a display diagram illustrating another example interface 500 provided by aspects of the invention. Tab 510 specifies general options that may be configurable by an administrator. Tab 510 also specifies a virtual machine storage manager 145, name 512, an application 514, an instance name 516, and a backup set name 518. The name 512 corresponds to the virtual machine storage manager 145 that hosts the data agent 155. The administrator can establish one or more sub-clients for the virtual machine storage manager 145. A sub-client is a portion of a client, and can contain either all of the client's data or a designated subset thereof. A default sub-client may be established for the data agent 155 that provides for protection of substantially all of the client's data (e.g., the data of the virtual machines 110). Protection of data generally refers to performing a storage operation on a primary copy of data to produce one or more secondary copies of the data. Storage operations performed to protect data may include copy operations, backup operations, snapshot operations, Hierarchical Storage Management (HSM) operations, migration operations, archive operations, and other types of storage operations known to those of skill in the art.

An administrator can also establish additional sub-clients to provide a further level of protection of virtual machine data. For example, for a virtual machine 110 upon which is loaded a mail application (e.g., a Microsoft Exchange mail server) and a database application (e.g., an Oracle database application), the administrator could establish one sub-client for protection of the data of the mail application (e.g., user mailboxes) and one sub-client for protection of the data of the database application (e.g., databases, datafiles and/or tablespaces). As another example, the administrator could establish sub-clients for organizational groupings (e.g., a sub-client for a marketing group, a sub-client for a sales group, etc.) and/or for virtual machines 110 based upon their purpose (e.g., a sub-client for virtual machines 110 used in production settings, a sub-client for virtual machines 110 used in test and/or development settings, etc.). Those of skill in the art will understand that an administrator may establish sub-clients according to various groupings.

An administrator can specify that any newly discovered virtual machines 110 that do not qualify for membership in an established sub-client group are to be added to the default sub-client by selecting check box 520. The administrator can also select that the data agent 155 is to discover virtual machines 110 and add them to particular sub-clients based upon rules by selecting check box 522. Since check box 522 is not selected, the options below it may not be selectable. However, selecting check box 522 allows the administrator to select radio buttons 524 (shown individually as radio buttons 524a and 524b) and buttons 526 (shown individually as buttons 526a and 526b), which enable functionality similar to that discussed with reference to the interface 400 of FIG. 4. For example, selection of the radio button 524a and the button 526a can enable the administrator to specify that all virtual machines 110 that match a regular expression (e.g., the regular expression "^[a–g]" could be used to match any virtual machines 110 (or any virtual machine hosts 105) beginning with names for which the first character begins with any character in the range of "a" to "g"), are to be added to a particular sub-client. As another example, selection of the radio button 524b and the button 526b can enable the administrator to specify that all virtual machines 110 that are associated with a particular virtual machine host 105 (that is identified by e.g., name, IP address, and/or other identifier) are to be added to a particular sub-client. Buttons 528 enable the administrator to confirm or cancel the selections and/or view help regarding the interface 500.

FIG. 5B is a display diagram illustrating another example interface 550 provided by aspects of the invention that is shown when tab 530 is selected. Tab 530 specifies the configurations of virtual machine hosts 105, virtual machines 110, and sub-clients. The tab 530 displays three columns, column 542, labeled "Virtual machine host," column 544, labeled "Virtual machine," and column 546, labeled "Sub-client name." Column 542 contains a listing of discovered virtual machine hosts 105. Column 544 contains a listing of discovered virtual machines 110, grouped by their associated virtual machine hosts 105. Column 546 contains a listing of sub-client names that are associated with each virtual machine 110. The virtual machine hosts 105 are divided into three groups 560, 562, and 564. Several of the virtual machines 110 hosted by the first group of virtual machines servers 105 have sub-client names of "Sub-client_test," indicating that they are part of this sub-client. The last virtual machine 110 in group 560 displays a list box 570 listing three different sub-clients that may be selected for the virtual machine 110 named "rack0102rh4×64." The virtual machine 110 is currently part of the sub-client "Sub-client_test," but other sub-clients may be selected. The virtual machines 110 that are part of the same sub-client have the same storage policy applied to protect their data.

Other virtual machines 110 that are part of the groups 562 or 564 are shown as being part of other sub-clients, such as the virtual machine 110 named "VM2" that is part of a sub-client 572 named "Database_SC," which may be a sub-client directed toward protecting data of a database application, and the virtual machine 110 named "VM3" that is part of a sub-client 574 named "Filesrv_SC," which may be a sub-client directed toward protecting data on a file server. Similarly, the virtual machines 110 named "SG111" and "SG3(1)" are both part of a sub-client 576 named "Marketing_Sales_SC," which may be a sub-client directed toward protecting data of marketing and sales organizations. The virtual machine 110 named "W2K8_SC" is also part of the sub-client 574.

Accordingly, two different virtual machines 110 on two different virtual machine hosts 105 may be part of the same sub-client.

The sub-client 574 may also include other, non-virtual machines. (Non-virtual machines can be defined broadly to include operating systems on computing devices that are not virtualized. For example, the operating systems of the virtual machine hosts 105, the virtual machine manager 202, and the virtual machine storage manager 145 can be considered to be non-virtual machines.) In this case, the same storage policy would be applied to protect data of both the associated virtual machines 115 and the non-virtual machines. An administrator can select one or more virtual machine hosts 105 and select a sub-client using the listbox 554, and then select the button 556 labeled "Apply" to change all of the selected virtual machine hosts 105 to a selected sub-client. When the administrator selects the button 552 labeled "Discover," an automated process for discovering virtual machine hosts 105 and/or virtual machines 110 is started. When it concludes, the interface 550 displays any virtual machine hosts 105 and/or virtual machines 110 discovered by the process. Buttons 578 enable the administrator to confirm or cancel the selections and/or view help regarding the interface 550.

FIG. 6 is a display diagram illustrating another example interface 600 provided by aspects of the invention. The interface 600 enables the administrator to specify virtual machine hosts 105 and/or virtual machines 110 and security credentials for the data agent 155 to use when accessing the virtual machines 110. For example, the virtual machine hosts 105 and/or the virtual machines 110 may use well-known authentication and authorization technicians (e.g., username and password, and/or access control lists (ACLs)) to control access to virtual machine data. The interface 600 includes a region 610 in which a listing of virtual machine hosts 105 and/or virtual machines 110 can be shown. The administrator can add, edit and/or remove virtual machine hosts 105 and/or virtual machines 110 by selecting buttons 612, 614 and/or 616, respectively. Buttons 618 enable the administrator to confirm or cancel the selections and/or view help regarding the interface 600.

Process for Copying Virtual Machine Data

FIG. 7 is a flow diagram illustrating a process 700 for copying data of a virtual machine 110. (E.g., according to the indication received in step 305 of the process 300 of FIG. 3, or according to a storage policy.) One or more of the entities illustrated in the figures (e.g., FIGS. 1A, 1B, 2, and/or 10) may perform different aspects of the process 700. In some examples, a storage manager 1005 instigates the process 700 by sending an indication specifying the storage operation to the data agent 155 on the virtual machine storage manager 145. The data agent 155 performs the copying of the data of the virtual machine 110. The data agent 155 sends the data to a secondary storage computing device 1065, which then stores the data on one or more storage devices 1015 (e.g., the secondary storage data store 175). In some examples, less than all of these entities may be involved in performing the storage operation. The processes described herein are indicated as being performed by the data agent 155, although those of skill in the art will understand that aspects of the process 700 may be performed by any one of the entities described herein (e.g., the storage manager 1005, the secondary storage computing device 1065, etc.).

As previously described, the integration component 157 encapsulates the virtual machine mount component 154 and provides an API for accessing the virtual machine mount component 154. For example, if the virtual machines 110 are VMware virtual machines, the virtual machine mount component 154 may be VMware's vcbMounter command-line tool, and the integration component 157 may encapsulate the functionality provided by vcbMounter into an API and redirect the output of the vcbMounter tool. At step 705, the data agent 155 calls an API function of the integration component 157 to quiesce the file systems of the virtual machine 110. Quiescing the file systems ensures that no file system writes are pending at the time a snapshot of a virtual machine 110 is taken, thereby allowing the creation of filesystem-consistent copies. The data agent 155 may, prior to quiescing the file systems in step 705, also quiesce applications that are executing on the virtual machine 110 or are loaded on the virtual machine 110.

At step 710, the data agent 155 calls an API function of the integration component 157 to put the virtual machine 110 into snapshot mode. Alternatively, the data agent 155 may call a function of the API component 210 to put the virtual machine 110 into snapshot mode. When the virtual machine 110 is put into snapshot mode, the virtual machine 110 stops writing to its virtual disks 140 (e.g., stops writing to the one or more *.vmdk files or *.vhd files) on the primary storage data store 135. The virtual machine 110 writes future writes to a delta disk file (e.g., a *delta.vmdk file) on the primary storage data store 135. Putting the virtual machine 110 into snapshot mode enables the virtual machine 110 to continue operating during the process 700. At step 715 the data agent 155 calls an API function of the integration component 157 to unquiesce the file systems of the virtual machine 110. The data agent 155 may, subsequent to unquiescing the file systems in step 705, also unquiesce any applications that were previously quiesced.

At step 720 the data agent 155 determines (e.g., based upon the indication received in step 305 of the process 300 of FIG. 3), how to copy the data of the virtual machine 110. For example, the data agent 155 may copy the data of the virtual machine 110 in one of three ways: 1) a file-level copy; 2) an image-level copy; or 3) a disk-level copy.

File-Level Copy

If the indication specifies that the data agent 155 is to perform a file-level copy, the process 700 branches to the file-level copy branch. For example, an administrator may provide that a file-level copy is to be performed if the administrator wishes to copy only certain files on a volume of a virtual disk 140 (e.g., only files within a certain directory or files that satisfy certain criteria). At step 722, the data agent 155 determines a mount point of the data store 165 on the virtual machine storage manager 145 (e.g., by dynamically determining an available mount point or by reading a stored indication of a mount point to use). For example, the mount point may be C:\mount\<virtual machine name>\ on the data store 165. At step 724 the data agent 155 determines the volumes of the virtual machine 110 (e.g., by calling an API function of the integration component 157 or by calling a function of the API component 210). For example, a virtual machine 110 using a Microsoft Windows operating system may have a C:\ volume, a D:\ volume, and so forth. At step 726 the data agent 155 mounts the determined volumes containing files at the determined mount point of the data store 165 (e.g., by again calling an API function of the integration component 157 or by calling a function of the API component 210).

As previously described, a virtual disk 140 corresponds to one or more files (e.g., one or more *.vmdk or *.vhd files), called virtual disk files, on the primary storage data store 135. A volume may span one or more virtual disks 140, or one or more volumes may be contained within a virtual disk 140. When the data agent 155 mounts the determined volumes, the primary storage data store 135 sends to the VLUN driver 152 a block list of the virtual disk files corresponding to the virtual disks 140 of the determined volumes. The VLUN driver 152 uses the block list information to present the determined volumes (e.g., as read-only volumes or as read-write volumes) to the operating system of the virtual machine storage manager 145. The data agent 155 communicates with the VLUN driver 152 to mount the determined volumes at the mount point of the virtual machine storage manager 145. Using the previous examples of a virtual machine 110 with a C:\ volume and a D:\ volume, the data agent 155 would mount these volumes at the following respective locations:
C:\mount\<virtual machine name>\letters\C
C:\mount\<virtual machine name>\letters\D After mounting the determined volumes, the data agent 155 can present to an administrator an interface displaying the mounted volumes and the directories and files on the mounted volumes, to enable the administrator to select which files and/or directories are to be copied. Alternatively, files and/or directories can be automatically selected in accordance with a storage policy determined by the virtual machine's 110 membership in a sub-client, or in accordance with a set of criteria or rules. At step 728 the data agent 155 copies the selected files and/or directories on the determined volumes to the secondary storage data store 175 (e.g., via a secondary storage computing device). The data agent 155 does so by providing an indication of a file and/or directory that is to be copied to the VLUN driver 152, which requests the blocks corresponding to the selected file and/or directory in the virtual disk files 140 on the primary storage datastore 135. The mapping between blocks and files/directories may be maintained by the primary storage data store 135 (e.g., in a table or other data structure).

After completing the copy, the data agent 155 at step 730 unmounts the determined volumes from the virtual machine storage manager 145 (e.g., by calling an API function of the integration component 157 or by calling a function of the API component 210). At step 732 the data agent 155 calls an API function of the integration component 157 to take the virtual machine 110 out of snapshot mode. Alternatively, the data agent 155 may call a function of the API component 210 to take the virtual machine 110 out of snapshot mode. Taking the virtual machine 110 out of snapshot mode consolidates the writes from the delta disk file (e.g., any intervening write operations to the virtual disk 140 between the time the virtual machine 110 was put into snapshot mode and the time it was taken out of snapshot mode) to the virtual disk file of the virtual disk 140. In this way, performing a copy operation on a primary copy of virtual machine data does not affect the virtual machine's 110 use of the data. Rather, operations can pick up at the point where they left off. The process 700 then concludes.

Volume-Level Copy

If the indication specifies that the data agent 155 is to perform a volume-level copy, the process 700 branches to the volume-level copy branch. The process for performing a volume-level copy is similar to that for performing a file-level copy, and steps 722 through 726 are effectively the same for this second branch of the process 700. At step 754 the data agent 155 analyzes the virtual volume and extracts metadata from the virtual volume. This process is described in more detail herein, e.g., with reference to FIG. 8.

After mounting the determined volumes (step 726 of the volume-level copy branch), the data agent 155 can present to an administrator an interface displaying the mounted volumes (optionally, the files and/or directories on the mounted volumes can also be displayed) to enable the administrator to select which volumes are to be copied. Alternatively, volumes can be automatically selected in accordance with a storage policy determined by the virtual machine's 110 membership in a sub-client, or in accordance with a set of criteria or rules. At step 734 the data agent 155 copies the selected volumes at the mount point on the virtual machine storage manager 145 to the secondary storage data store 175 (e.g., via a secondary storage computing device). The data agent 155 does so by providing an indication of a volume that is to be copied to the VLUN driver 152, which requests the blocks corresponding to the selected volumes in the virtual disk files 140 on the primary storage datastore 135. The mapping between blocks and volumes may be maintained by the primary storage data store 135 (e.g., in a table or other data structure).

After copying, the data agent 155 at step 730 unmounts the determined volumes from the virtual machine storage manager 145 (e.g., by calling an API function of the integration component 157 or by calling a function of the API component 210). At step 732 the data agent 155 calls an API function of the integration component 157 to take the virtual machine 110 out of snapshot mode. Alternatively, the data agent 155 may call a function of the API component 210 to take the virtual machine 110 out of snapshot mode. Taking the virtual machine 110 out of snapshot mode consolidates the writes to the delta disk file to the virtual disk file of the virtual disk 140. The process 700 then concludes.

One advantage of performing copy operations at the file-level or the volume-level is that the data agent 155 can copy the virtual machine data from the primary storage datastore 135 to the secondary storage data store 175 without having to copy it to the datastore 165 on the virtual machine storage manager 145. Stated another way, the data agent 155 can obtain the virtual machine data from the primary storage datastore 135, perform any specified operations upon it (e.g., compress it, single or variable instance it, encrypt it, etc.), and stream the virtual machine data to the secondary storage data store 175 (e.g., via a secondary storage computing device 1065), without staging or caching the data at the virtual machine storage manager 145. This allows the data agent 155 to copy the data directly to the secondary storage data store 175, without first copying it to an intermediate location. Accordingly, the data agent 155 can quickly and efficiently perform file-level and volume-level copies of data of virtual machines 110.

Disk-Level Copy

The file-level copy and the volume-level copy can be thought of as operating at the virtual level. In other words, the data agent 155 may have to utilize data structures, functions or other information or aspects exposed or provided by a virtual machine 110 (or the virtual machine host 105) in order to copy the data of the virtual machine 110 to the secondary storage data store 175. For example, in order to perform a file-level or volume-level copy of the data of a virtual machine 110, the data agent 155 utilizes some information or aspect of the virtual machine 110 to determine its files and directories and/or volumes. The data agent 155 does so in order to present the determined files and directories or volumes for their selection by an administrator, or in order to apply, implement or execute storage operations according to a storage policy. In contrast, a disk-level copy can be thought of as operating at a non-virtual level (e.g., at a level of the physical computer hosting the virtual machine 110 and/or the physical storage media upon which the virtual machine data is stored). In other words, the data agent 155 can directly access the physical storage media storing the data of the virtual machine 110 (e.g., the primary storage data store 135 connected via the SAN 130) to copy the virtual disks 140 of the virtual machine 110. Because the data agent 155 is copying the virtual disks 140 without necessarily determining files and directories or volumes of the virtual machine 110, the data agent 155 does not necessarily have to utilize information or aspects of the virtual machine 110 or the virtual machine host 105.

If the indication specifies that the data agent 155 is to perform a disk-level copy, the process branches to the disk-level copy branch. At step 746, the data agent 155 determines a copy point on the data store 165. For example, the copy point may be C:\copy\<virtual machine name>-copyvirtualmachine\ on the data store 165. At step 748 the data agent 155 determines the virtual disk and any associated configuration files (e.g., the *.vmx file and/or the disk descriptor files) of the virtual machine 110 (e.g., by calling an API function of the integration component 157 or by calling a function of the API component 210). The primary storage data store 135 sends to the VLUN driver 152 a block list of the virtual disk and configuration files. At step 750, the data agent 155 copies these files to the copy point on the datastore 165 on the virtual machine storage manager 145. The data agent 155 does so by providing an indication of the virtual disk and configuration files to the VLUN driver 152, which requests the blocks corresponding to the virtual disk and configuration files from the primary storage datastore 135. The mapping between blocks and files/directories may be maintained by the primary storage data store 135 (e.g., in a table or other data structure).

At step 752 the data agent 155 calls an API function of the integration component 157 to take the virtual machine 110 out of snapshot mode (or calls a function of the API component 210). At step 754 the data agent 155 analyzes the virtual disk and configuration files and extracts metadata from the virtual disk and configuration files. This process is described in more detail herein, e.g., with reference to FIG. 8. At step 756 the data agent 155 copies the virtual disk and configuration files to the secondary storage data store 175. At step 758 the data agent 155 removes the copied virtual disk and configuration files from the data store 165 on the virtual machine storage manager 145. The process 700 then concludes.

Because a disk-level copy operates essentially at a non-virtual level, it may not have to utilize information or aspects of the virtual machine 110 (or the virtual machine host 105) in order to copy its data to the secondary storage data store 175. Therefore, a disk-level copy may not necessarily involve much of the overhead involved in a file-level copy or a volume-level copy. Rather, a disk-level copy can directly access the physical storage media storing the data of the virtual machine 110 (e.g., the primary storage data store 135) to copy the virtual disks 140 of the virtual machine 110. Because a disk-level copy can directly access the primary storage data store 135, the volumes on the virtual disks 140 do not need to be mounted. Accordingly, a disk-level copy may be performed faster and more efficiently than a file-level copy or a volume-level copy.

Process for Extracting Metadata

Certain steps in the following process for extracting metadata from the virtual volumes and/or the virtual disk and configuration files are described below using a configuration of a virtual machine 110 having a single virtual disk 140 comprised in a single virtual disk file. Those of skill in the art will understand that the process is not limited in any way to this configuration. Rather, the following process may be used to extract metadata from virtual disk and configuration files that are arranged or structured in a wide variety of configurations, such as multiple virtual disks 140 spanning multiple virtual disk files. Generally, metadata refers to data or information about data. Metadata may include, for example, data relating to relationships between virtual disk files, data relating to how volumes are structured on virtual disks 140, and data relating to a location of a file allocation table or a master file table. Metadata may also include data describing files and data objects (e.g., names of files or data objects, timestamps of files or data objects, ACL entries, and file or data object summary, author, source or other information). Metadata may also include data relating to storage operations or storage management, such as data locations, storage management components associated with data, storage devices used in performing storage operations, index data, data application type, or other data. Those of skill in the art will understand that metadata may include data or information about data other than the examples given herein.

FIG. 8 is a flow diagram illustrating a process 800 performed by the virtual disk analyzer component 160 for extracting metadata (e.g., file location metadata and metadata describing virtual disks 140 and/or files and/or volumes within virtual disks 140) from virtual volumes and/or virtual disk and configuration files. The process 800 begins at step 805, where the virtual disk analyzer component 160 of the data agent 155 accesses the configuration files to determine if there are any parent-child relationships between virtual disk files (e.g., the virtual disk analyzer component 160 determines how many links in a chain of virtual disk files there are). The virtual disk analyzer component 160 performs this step by reading and analyzing the virtual disk and/or configuration files.

For example, for a VMware virtual machine 110, the virtual disk analyzer component 160 may read and analyze the *.vmx configuration files and/or the *.vmdk disk descriptor files. In this example, the parent virtual disk 140 may be named "basedisk.vmdk." The parent virtual disk 140 may have a *.vmdk disk descriptor file with an entry that uniquely identifies the parent virtual disk 140 having the following syntax:

[identifier-name]=[identifier-value]

For example, the entry CID=daf6cf10 comports with this syntax. A first child virtual disk 140 (e.g., a first snapshot) may be named "basedisk-000001.vmdk." The first child virtual disk 140 may have a *.vmdk disk descriptor file with an entry that uniquely identifies its parent having the following syntax:

[parentidentifier-name]=[parentidentifier-value]

For example, the entry parentCID=daf6cf10 comports with this syntax. The virtual disk analyzer component 160 may identify parent-child relationships between virtual disk files in other ways, such as by observing access to virtual disk files inferring the relationships by such observations. At step 810 the virtual disk analyzer component 160 determines the relationships between virtual disk files (the virtual disk analyzer component 160 determines how the virtual disk 140 is structured—how many extents make up each link in the chain). The virtual disk analyzer component 160 performs this step by reading and analyzing the disk descriptor file if it is a separate file or by reading the disk descriptor information if it is embedded into the virtual disk file. The virtual disk analyzer component 160 may determine the relationships between virtual disk files in other ways, such as by observing access to virtual disk files and inferring the relationships from such observations.

At step 815 the virtual disk analyzer component 160 determines how the partitions and volumes are structured on the virtual disks 140. The virtual disk analyzer component 160 does this by reading the sectors of the virtual disks 140 that contain the partition tables to determine how the virtual disk 140 is structured (e.g., whether it is a basic or a dynamic disk). The virtual disk analyzer component 160 also reads the sectors of the virtual disks 140 that contain the logical volume manager databases. Because the locations of these sectors (e.g., the sectors of the partition tables and the logical volume manager databases) are well-known and/or can be dynamically determined, the virtual disk analyzer component 160 can use techniques that are well-known to those of skill in the art to read those sectors and extract the necessary data. The virtual disk analyzer component 160 is thus able to determine how the virtual disks 140 is partitioned by the operating system 120 of the virtual machine 110 and how volumes are laid out in the virtual disks 140 (e.g., if there are simple volumes, spanned volumes, striped volumes, mirrored volumes, and/or RAID-5 volumes, etc.)

At step 820 the virtual disk analyzer component 160 determines the location of the Master File Table (MFT) or similar file allocation table for each volume. As with the partition tables and the logical volume manager databases, the locations of the sectors containing the MFT are well-known and/ or can be dynamically determined. Therefore, the virtual disk analyzer component 160 can use techniques that are well-known to those of skill in the art to determine the location of the MFT. At step 825 the virtual disk analyzer component 160 stores the determined parent-child relationships relationships between virtual disk files, the determined structure of volumes of the virtual disks 140, and the determined location of the MFT in a data structure, such as a table. For example, a table having the following schema may be used to store this information:

| Virtual Machine ID | Virtual disk file relationships | Volume structures | Location of MFT |
|---|---|---|---|
| E.g., a substantially unique identifier for the virtual machine 110 | E.g., description of the parent-child relationships, such as by a hierarchical description | E.g., partition information and how virtual volumes are laid out on virtual disks | E.g., the location of the MFT within each volume |

The virtual disk analyzer component 160 may use other data structures to store this information in addition or as an alternative to the preceding table. The virtual disk analyzer component 160 may store this information in the secondary storage data store 175 or in another data store. The virtual disk analyzer component 160 may also collect other metadata, such as metadata describing virtual disks 140 and/or metadata describing files and/or data objects within virtual disks 140. For example, instead of storing the determined location of the MFT, the virtual disk analyzer component 160 could store the locations of files or data objects within virtual disks 140. After storing this metadata, the process 800 then concludes.

Process for Restoring Data of Virtual Machines

FIG. 9 is a flow diagram illustrating a process 900 performed by the secondary storage computing device 1065 for restoring virtual machine data. One or more of the entities illustrated in the figures (e.g., FIGS. 1A, 1B, 2, and/or 10) may perform different aspects of the process 900. In some examples, an administrator at a management console instigates the process 900 by sending an indication to restore virtual machine data to the secondary storage computing device 1065. The secondary storage computing device 1065 accesses the index 1061 to locate the virtual machine data, and accesses the storage devices 1015 (e.g., the secondary storage data store 175) upon which the virtual machine data is located. The secondary storage computing device 1065 restores the data from the storage devices 1015 to a specified location (e.g., a location specified by the administrator).

The process 900 begins at step 905 where the secondary storage computing device 1065 receives an indication to restore data of one or more virtual machines 110. The indication can be to restore one or more files, one or more volumes, one or more virtual disks of a virtual machine 110, or an entire virtual machine 110. At step 910 the secondary storage computing device 1065 determines how (e.g., by analyzing the index 1061) the data agent 155 originally copied the virtual machine data, either: 1) a file-level copy; 2) an image-level copy; or 3) a disk-level copy.

Restore from a File-Level Copy

If the data agent 155 originally performed a file-level copy, the process 900 branches to the file-level restore branch. At step 915, the secondary storage computing device 1065 mounts a copy set corresponding to the files to be restored from the secondary storage data store 175. The copy set may be manually selected by an administrator or automatically selected based on an association between the copy set and the virtual machine from which the data in the copy set came. Additionally or alternatively, the copy set may be automatically determined based upon the metadata extracted and stored (described with reference to, e.g., FIG. 8) or based upon other metadata (e.g., metadata stored in index 1061).

Because the data agent 155 originally performed a file-level copy (of selected files and/or directories), the secondary storage computing device 1065 generally restores files and/or directories out of the copy set. At step 920 the secondary storage computing device 1065 restores one or more files or directories (e.g., a single file) out of the copy set. For example, the secondary storage computing device 1065 can call a function of an API exposed by a virtual machine 110 or its hosting virtual machine host 105 to restore the one or more files or directories to the virtual machine 110. As another example, the secondary storage computing device 1065 can copy the one or more files or directories to the primary storage data store 135. The secondary storage computing device 1065 can restore the one or more files or directories to the original virtual machine 110 from which they were originally copied, to a different virtual machine 110, to a non-virtual machine, and/or to another storage device 1015. The process 900 then concludes.

Restore from a Volume-Level Copy

If the data agent 155 originally performed a volume-level copy, the process 900 branches to the volume-level restore branch. At step 915, the secondary storage computing device 1065 mounts a copy set corresponding to the files or volumes to be restored from the secondary storage data store 175. The copy set may be manually selected by an administrator or automatically selected based on an association between the copy set and the virtual machine 110 from which the data in the copy set came. Additionally or alternatively, the copy set may be automatically determined based upon the metadata extracted and stored (described with reference to, e.g., FIG. 8) or based upon other metadata (e.g., metadata stored in index 1061).

At step 945 the secondary storage computing device 1065 accesses metadata corresponding to the data that is to be restored (e.g., the determined location of the MFT). This is the metadata that was stored in step 825 of the process 800. At step 960 the secondary storage computing device 1065 uses the determined location of the MFT to access the MFT and use the entries in the MFT to determine where the files and directories on the virtual disk 140 are located (e.g., on which sectors of the virtual disk 140 a particular file is located).

Because the data agent 155 originally performed a volume-level copy (of selected volumes including files and/or directories within the volumes), the secondary storage computing device 1065 can generally restore both files and/or directories and entire volumes (e.g., an entire C:\ volume, an entire D:\ volume, etc.) out of the copy set. If the secondary storage computing device 1065 is to restore a file, the process 900 branches to step 920. At this step the secondary storage computing device 1065 restores one or more files or directories out of the copy set (e.g., a single file). The secondary storage computing device 1065 can restore the one or more files or directories to the original virtual machine 110 from which they were originally copied, to a different virtual machine 110, to a non-virtual machine, and/or to another storage device 1015. For example, if the original virtual machine 110 no longer exists, the one or more files or directories may be restored to its replacement.

If instead, the secondary storage computing device 1065 is to restore a volume, the process 900 branches to step 930. At this step the secondary storage computing device 1065 restores one or more volumes out of the copy set. The data agent 155 secondary storage computing device 1065 can restore the one or more volumes to the original virtual machine 110 from which they were originally copied up, to a different virtual machine 110, or to a non-virtual machine and/or to another storage device 1015. For example, a C:\ volume may be restored out of a copy set to the original virtual machine 110 from which it was copied, thus overwriting its existing C:\ volume. As another example, a D:\ volume may be restored out of a copy set to another virtual machine 110, thus replacing its current D:\ volume.

The secondary storage computing device 1065 may restore the files, directories and/or volumes to various locations. For example, the secondary storage computing device 1065 can copy the files, directories and/or volumes to the primary storage data store 135. The secondary storage computing device 1065 can restore the one or more volumes to the original virtual machine 110 from which they were originally copied up, to a different virtual machine 110, to a non-virtual machine (e.g., to a physical machine), and/or to another storage device 1015. For example, an entire D:\ volume from an original virtual machine 110 may be restored to the original virtual machine 110, to another virtual machine 110 and/or to a non-virtual machine (e.g., to a physical machine). As described in more detail herein, a volume of a virtual machine 110 may be restored in its original format (e.g., if the volume came from a VMware virtual machine 110, it can be restored as a volume in the VMware format, such as a *.vmdk file) or converted to another format (e.g., if the volume came from a VMware virtual machine 110, it can be restored as a volume in the Microsoft format, such as a *.vhd file). The secondary storage computing device 1065 can also restore the volume as a container file, from which the volume can be extracted. After steps 920 and/or 930, the process 900 then concludes.

Restore from a Disk-Level Copy

If the data agent 155 originally performed a disk-level copy, the process 900 branches to the disk-level restore branch. At step 915, the secondary storage computing device 1065 mounts a copy set corresponding to the virtual disks, files, volumes, and/or virtual machines 110 to be restored from the secondary storage data store 175. The copy set may be manually selected by an administrator or automatically selected based on an association between the copy set and the virtual machine from which the data in the copy set came. Additionally or alternatively, the copy set may be automatically determined based upon the metadata extracted and stored (described herein, e.g., with reference to FIG. 8) or based upon other metadata (e.g., metadata stored in index 1061).

At step 945 the secondary storage computing device 1065 accesses metadata corresponding to the data that is to be restored (e.g., the determined parent-child relationships and relationships between virtual disk files, the determined structure of volumes of the virtual disks 140, and the determined location of the MFT). This is the metadata that was stored in step 825 of the process 800. At step 950 the secondary storage computing device 1065 uses the determined parent-child relationships and relationships between virtual disk files to reconstruct the virtual disks 140. For example, if a virtual disk 140 is comprised of numerous virtual disk files, the secondary storage computing device 1065 uses the determined relationships between them to link them together into a single virtual disk file. In so doing, the secondary storage computing device 1065 may access grain directories and grain tables within virtual disk files. Grain directories and grain tables are data structures located within virtual disk files that specify the sectors (blocks) within virtual disks 140 that have been allocated for data storage. The secondary storage computing device 1065 may access these data structures to locate data within virtual disks 140.

At step 955 the secondary storage computing device 1065 uses the determined structure of volumes of the virtual disks 140 to reconstruct the volumes. At step 960 the secondary storage computing device 1065 uses the determined location of the MFT to access the MFT and uses the entries in the MFT to determine where the files and directories on the virtual disk 140 are located (e.g., on which sectors of the virtual disk 140 a particular file is located).

Because the data agent 155 originally performed a disk-level copy (of virtual disk and configuration files), the secondary storage computing device 1065 can restore files or directories, entire volumes (e.g., an entire C:\ volume, an entire D:\ volume, etc.) as well as an entire virtual machine 110 out of the copy set. If an entire virtual machine 110 is to be restored, the process 900 branches to step 965. The secondary storage computing device 1065 can copy all the virtual disk and configuration files to the location where the entire virtual machine 110 is to be restored. This can be the original location of the virtual machine 110 (on the original virtual machine host 105), or it can be a new location where the virtual machine had not originally been located (e.g., on a new virtual machine host 105.) If the virtual disk and configuration files are copied to the original virtual machine host 105, the virtual machine host 105 should be able to restart the virtual machine 110, which can then recommence operating in the state it existed in when its virtual disk and configuration files were originally copied.

Similarly, if the virtual disk and configuration files are copied to a new virtual machine host 105, the new virtual machine host 105 should be able to start the virtual machine 110, which can then commence operating in the state it existed in when its virtual disk and configuration files were originally copied. The ability to restore a virtual machine 110 to a new virtual machine host 105 other than its original virtual machine host 105 allows virtual machines 110 to be moved or "floated" from one virtual machine host 105 to another. The secondary storage computing device 1065 can also restore the entire virtual machine 110 as a container file, from which the entire virtual machine 110 can be extracted. After step 965, the process 900 then concludes.

If instead of restoring an entire virtual machine 110, the secondary storage computing device 1065 is to restore a volume, the process 900 branches to step 930. At this step the secondary storage computing device 1065 restores one or more volumes out of the copy set. After step 930, the process 900 then concludes.

If instead of restoring an entire virtual machine 110 or a volume, the secondary storage computing device 1065 is to restore a file, the process 900 branches to step 920. At this step the secondary storage computing device 1065 restores one or more files or directories out of the copy set (e.g., a single file). The secondary storage computing device 1065 can restore the one or more files or directories to the original virtual machine 110 from which they were originally copied, to a different virtual machine 110, to non-virtual machine, and/or to another storage device 1015. The process 900 then concludes.

If instead of restoring an entire virtual machine 110, a volume, or a file, the secondary storage computing device 1065 is to restore one or more virtual disks, the process 900 branches to step 970. At this step the secondary storage computing device 1065 restores the virtual disk and configuration files corresponding to the one or more virtual disks to be restored out of the copy set. The secondary storage computing device 1065 can restore the one or more virtual disks to the original virtual machine host 105 from which they were originally copied. Additionally or alternatively, the secondary storage computing device 1065 can restore the one or more virtual disks to the original virtual machine 110 from which they were originally copied, to a different virtual machine 110, to a non-virtual machine, and/or to another storage device 1015. If the one or more virtual disks are to be restored to the virtual machine 105, they may overwrite, replace and/or supplement the existing virtual disks of a virtual machine 110. The process 900 then concludes.

Depending upon what the secondary storage computing device 1065 is to restore, certain steps in the process 900 may not need to be performed. For example, if the secondary storage computing device 1065 is to restore an entire virtual machine 110 out of a disk-level copy, the data agent 155 may not need to access the stored metadata (step 945) or reconstruct the virtual disk 140, volumes and files (steps 950, 955 and 960). The data agent 155 can simply mount the copy set and copy the virtual disk and configuration files to the appropriate location. As another example, if the secondary storage computing device 1065 is to restore a volume out of a disk-level copy, the secondary storage computing device 1065 may not need to reconstruct files using the MFT, as mentioned above. The secondary storage computing device 1065 can simply reconstruct the volumes and then copy the volumes to the appropriate location. Those of skill in the art will understand that more or fewer steps than those illustrated in the process 900 may be used to restore data of virtual machines 110.

As previously described, one advantage of performing a disk-level copy is that it may be quicker and more efficient than file-level or volume-level copying. Also as previously described, the process of extracting metadata from the virtual disk and configuration files enables the ability to restore individual files, directories and/or volumes to the virtual machine 110 or to other locations (e.g., to other virtual machines 110 to non-virtual machines, and/or to other storage devices 1015). The combination of a disk-level copy and the capability to restore individual files, directories and/or volumes of a virtual machine 110 provides for a fast and efficient process for duplicating primary copies of data, while still enabling granular access (e.g., at the individual file or data object level) to the duplicated primary data (granular access to the secondary copies of data is enabled). This combination optimizes the aspect of virtual machine data management that is likely performed most frequently (duplication of primary copies of data), but not at the expense of the aspect that is likely performed less often (restoration of secondary copies of data), because granular access to duplicated primary copies of data is still enabled.

Suitable Data Storage Enterprise

FIG. 10 illustrates an example of one arrangement of resources in a computing network, comprising a data storage system 1050. The resources in the data storage system 1050 may employ the processes and techniques described herein. The system 1050 includes a storage manager 1005, one or more data agents 1095, one or more secondary storage computing devices 1065, one or more storage devices 1015, one or more clients 1030, one or more data or information stores 1060 and 1062, a single instancing database 1023, an index 1011, a jobs agent 1020, an interface agent 1025, and a management agent 1031. The system 1050 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 1050 may also represent a modular storage system such as the CommVault Simpana system, also available from CommVault Systems, Inc.

The system 1050 may generally include combinations of hardware and software components associated with performing storage operations on electronic data. Storage operations include copying, backing up, creating, storing, retrieving, and/or migrating primary storage data (e.g., data stores 1060 and/or 1062) and secondary storage data (which may include, for example, snapshot copies, backup copies, HSM copies, archive copies, and other types of copies of electronic data stored on storage devices 1015). The system 1050 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 1015, retained for a specified period of time before being aged to another tier of secondary storage, copied to the storage device 1015 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) Storage policies and/or schedule policies may be stored in a database of the storage manager 1005, to archive media as metadata for use in restore operations or other storage operations, or to other locations or components of the system 1050.

The system 1050 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 1005 (or management agent 1031), a secondary storage computing device 1065, a client 1030, and other components as described herein. A second storage operation cell may contain the same or similar physical components; however, it may be configured to perform a second type of storage operations, such as storage resource management ("SRM") operations, and may include monitoring a primary data copy or performing other known SRM operations.

Thus, as can be seen from the above, although the first and second storage operation cells are logically distinct entities configured to perform different management functions (HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 1065, client 1030, or other network device connected to a primary storage volume, while a storage operation cell configured to perform HSM tasks may instead include a secondary storage computing device 1065, client 1030, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 1005 that coordinates storage operations via the same secondary storage computing devices 1065 and storage devices 1015. This "overlapping" configuration allows storage resources to be accessed by more than one storage manager 1005, such that multiple paths exist to each storage device 1015 facilitating failover, load balancing, and promoting robust data access via alternative routes.

Alternatively or additionally, the same storage manager 1005 may control two or more storage operation cells (whether or not each storage operation cell has its own dedicated storage manager 1005). Moreover, in certain embodiments, the extent or type of overlap may be user-defined (through a control console) or may be automatically configured to optimize data storage and/or retrieval.

Data agent 1095 may be a software module or part of a software module that is generally responsible for performing storage operations on the data of the client 1030 stored in data store 1060/1062 or other memory location. Each client 1030 may have at least one data agent 1095 and the system 1050 can support multiple clients 1030. Data agent 1095 may be distributed between client 1030 and storage manager 1005 (and any other intermediate components), or it may be deployed from a remote location or its functions approximated by a remote process that performs some or all of the functions of data agent 1095.

The overall system 1050 may employ multiple data agents 1095, each of which may perform storage operations on data associated with a different application. For example, different individual data agents 1095 may be designed to handle Microsoft Exchange data, Lotus Notes data, Microsoft Windows 2000 file system data, Microsoft Active Directory Objects data, and other types of data known in the art. Other embodiments may employ one or more generic data agents 1095 that can handle and process multiple data types rather than using the specialized data agents described above.

If a client 1030 has two or more types of data, one data agent 1095 may be required for each data type to perform storage operations on the data of the client 1030. For example, to back up, migrate, and restore all the data on a Microsoft Exchange 2000 server, the client 1030 may use one Microsoft Exchange 2000 Mailbox data agent 1095 to back up the Exchange 2000 mailboxes, one Microsoft Exchange 2000 Database data agent 1095 to back up the Exchange 2000 databases, one Microsoft Exchange 2000 Public Folder data agent 1095 to back up the Exchange 2000 Public Folders, and one Microsoft Windows 2000 File System data agent 1095 to back up the file system of the client 1030. These data agents 1095 would be treated as four separate data agents 1095 by the system even though they reside on the same client 1030.

Alternatively, the overall system 1050 may use one or more generic data agents 1095, each of which may be capable of handling two or more data types. For example, one generic data agent 1095 may be used to back up, migrate and restore Microsoft Exchange 2000 Mailbox data and Microsoft Exchange 2000 Database data while another generic data agent 1095 may handle Microsoft Exchange 2000 Public Folder data and Microsoft Windows 2000 File System data, etc.

Data agents 1095 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 1005 or secondary storage computing devices 1065. As used herein, a file or a data object refers to any collection or grouping of bytes of data that can be viewed as one or more logical units.

Generally speaking, storage manager 1005 may be a software module or other application that coordinates and controls storage operations performed by the system 1050. Storage manager 1005 may communicate with some or all elements of the system 1050, including clients 1030, data agents 1095, secondary storage computing devices 1065, and storage devices 1015, to initiate and manage storage operations (e.g., backups, migrations, data recovery operations, etc.).

Storage manager 1005 may include a jobs agent 1020 that monitors the status of some or all storage operations previously performed, currently being performed, or scheduled to be performed by the system 1050. Jobs agent 1020 may be communicatively coupled to an interface agent 1025 (e.g., a software module or application). Interface agent 1025 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 1025, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 1015).

Storage manager 1005 may also include a management agent 1031 that is typically implemented as a software module or application program. In general, management agent 1031 provides an interface that allows various management agents 1031 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 1025. This allows each storage operation cell to send and receive certain pertinent information from other storage operation cells, including status information, routing information, information regarding capacity and utilization, etc. These communications paths may also be used to convey information and instructions regarding storage operations.

For example, a management agent 1031 in a first storage operation cell may communicate with a management agent 1031 in a second storage operation cell regarding the status of storage operations in the second storage operation cell. Another illustrative example includes the case where a management agent 1031 in a first storage operation cell communicates with a management agent 1031 in a second storage operation cell to control storage manager 1005 (and other components) of the second storage operation cell via management agent 1031 contained in storage manager 1005.

Another illustrative example is the case where management agent 1031 in a first storage operation cell communicates directly with and controls the components in a second storage operation cell and bypasses the storage manager 1005 in the second storage operation cell. If desired, storage operation cells can also be organized hierarchically such that hierarchically superior cells control or pass information to hierarchically subordinate cells or vice versa.

Storage manager 1005 may also maintain an index, a database, or other data structure 1011. The data stored in database 1011 may be used to indicate logical associations between components of the system, user preferences, management tasks, media containerization and data storage information or other useful data. For example, the storage manager 1005 may use data from database 1011 to track logical associations between secondary storage computing device 1065 and storage devices 1015 (or movement of data as containerized from primary to secondary storage).

Generally speaking, the secondary storage computing device 1065, which may also be referred to as a media agent, may be implemented as a software module that conveys data, as directed by storage manager 1005, between a client 1030 and one or more storage devices 1015 such as a tape library, a magnetic media storage device, an optical media storage device, or any other suitable storage device. In one embodiment, secondary storage computing device 1065 may be communicatively coupled to and control a storage device 1015. A secondary storage computing device 1065 may be considered to be associated with a particular storage device 1015 if that secondary storage computing device 1065 is capable of routing and storing data to that particular storage device 1015.

In operation, a secondary storage computing device 1065 associated with a particular storage device 1015 may instruct the storage device to use a robotic arm or other retrieval means to load or eject a certain storage media, and to subsequently archive, migrate, or restore data to or from that media. Secondary storage computing device 1065 may communicate with a storage device 1015 via a suitable communications path such as a SCSI or Fibre Channel communications link. In some embodiments, the storage device 1015 may be communicatively coupled to the storage manager 1005 via a SAN.

Each secondary storage computing device 1065 may maintain an index, a database, or other data structure 1061 that may store index data generated during storage operations for secondary storage (SS) as described herein, including creating a metabase (MB). For example, performing storage operations on Microsoft Exchange data may generate index data. Such index data provides a secondary storage computing device 1065 or other external device with a fast and efficient mechanism for locating data stored or backed up. Thus, a secondary storage computing device index 1061, or a database 1011 of a storage manager 1005, may store data associating a client 1030 with a particular secondary storage computing device 1065 or storage device 1015, for example, as specified in a storage policy, while a database or other data structure in secondary storage computing device 1065 may indicate where specifically the data of the client 1030 is stored in storage device 1015, what specific files were stored, and other information associated with storage of the data of the client 1030. In some embodiments, such index data may be stored along with the data backed up in a storage device 1015, with an additional copy of the index data written to index cache in a secondary storage device. Thus the data is readily available for use in storage operations and other activities without having to be first retrieved from the storage device 1015.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 1015. In some embodiments, the cached information may include information regarding format or containerization of archives or other files stored on storage device 1015.

One or more of the secondary storage computing devices 1065 may also maintain one or more single instance databases 1023. Single instancing (alternatively called data deduplication) generally refers to storing in secondary storage only a single instance of each data object (or data block) in a set of data (e.g., primary data). More details as to single instancing may be found in one or more of the following previously-referenced U.S. patent application Ser. Nos. 11/269,512, 12/145,347, 12/145,342, 11/963,623, 11/950,376, and 61/100,686.

In some examples, the secondary storage computing devices 1065 maintain one or more variable instance databases. Variable instancing generally refers to storing in secondary storage one or more instances, but fewer than the total number of instances, of each data object (or data block) in a set of data (e.g., primary data). More details as to variable instancing may be found in the previously-referenced U.S. Pat. App. No. 61/164,803.

In some embodiments, certain components may reside and execute on the same computer. For example, in some embodiments, a client 1030 such as a data agent 1095, or a storage manager 1005, coordinates and directs local archiving, migration, and retrieval application functions as further described in the previously-referenced U.S. patent application Ser. No. 09/610,738. This client 1030 can function independently or together with other similar clients 1030.

As shown in FIG. 10, secondary storage computing devices 1065 each has its own associated metabase 1061. Each client 1030 may also have its own associated metabase 1070. However in some embodiments, each "tier" of storage, such as primary storage, secondary storage, tertiary storage, etc., may have multiple metabases or a centralized metabase, as described herein. For example, rather than a separate metabase or index associated with each client 1030 in FIG. 10, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 1005 or other management module may keep track of certain information that allows the storage manager 1005 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 1030, and can contain either all of the data of the clients 1030 or a designated subset thereof. As depicted in FIG. 10, the data store 1062 includes two sub-clients. For example, an administrator (or other user with the appropriate permissions; the term administrator is used herein for brevity) may find it preferable to separate email data from financial data using two different sub-clients having different storage preferences, retention criteria, etc.

Detection of Virtual Machines and Other Virtual Resources

As previously noted, because virtual machines 110 may be easily set up and torn down, they may be less permanent in nature than non-virtual machines. Due to this potential transience of virtual machines 110, it may be more difficult to detect them, especially in a heterogeneous or otherwise disparate environment. For example, a virtual machine host 105 may host a number of different virtual machines 110. Virtual machines 110 may be discovered using the techniques previously described herein. Alternatively or additionally, virtual machines 110 could be detected by periodically performing dynamic virtual resource detection routines to identify virtual machines 110 in the network 180 (or some subset thereof, such as a subnet). For example, the data agent 155 (or other agent) could analyze program behaviors corresponding to known virtual resource behaviors, perform fingerprint, hash, or other characteristic-based detection methods or routines, query a system datastore (e.g., the Windows registry) or other data structure of the virtual machine host 105 for keys or other identifiers associated with virtual resources. The data agent 155 may use other methods and/or combinations of these methods to detect virtual machines 110.

Once detected, the data agent 155 could maintain virtual machine identifiers in a database or other data structure and use associated program logic to track existing virtual machines 110 in the network 180. Alternatively or additionally, an administrator could manually populate the database, or it could be populated as part of an install or virtual resource creation process, or by an agent or other software module directed to detecting installation of virtual machines. The data agent 155 could update the database to remove a virtual machine identifier upon receiving an affirmative indication that the corresponding virtual machine 110 has been taken down or removed from its virtual machine host 105. Alternatively or additionally, the data agent 155 could periodically poll virtual machines 110 to determine if the virtual machines 110 are still functioning. If a virtual machine 110 does not respond after a certain number of polling attempts, the data agent 155 may assume that the virtual machine 110 is no longer functioning and thus remove its identifier from the database. Alternatively or additionally, the virtual machines 110 could periodically notify the data agent 155 that they are still functioning (e.g., by sending heartbeat messages to the data agent 155). Upon a failure to receive notifications from a virtual machine 110 within a certain time period, the data agent 155 could remove its identifier from the database. The data agent 155 may use other methods and/or combinations of these methods to maintain an up-to-date listing of virtual machine identifiers in the database.

These techniques for detecting virtual machines 110 and maintaining identifiers thereof may also be used to detect virtual resources of virtual machines 110 and maintain identifiers thereof. For example, a virtual machine 110 may be coupled to a virtual storage device such as a virtual NAS device or a virtual optical drive. The data agent 155 could detect these virtual resources and maintain identifiers for them in a database or other data structure. The virtual resources may then be addressed as if they were actual resources. Once detected or identified, storage operations related to the virtual resources could be performed according to non-virtualized storage policies or preferences, according to storage policies or preferences directed specifically to virtual resources, and/or to combinations of non-virtualized and virtualized storage policies and preferences. As another example, a virtual machine 110 may be coupled to a virtual tape library (VTL). The data agent 155 may perform additional analysis on the nature and structure of the virtual resource which underlies the VTL (e.g., a virtual disk 140). This may allow the data agent 155 to realize additional optimizations relating to storage operations associated with the data of the VTL. For example, even though the virtual resource is a VTL (necessitating sequential access), storage operations might be able to be performed non-linearly or in a random access fashion since the underlying virtual resource allows random access. Therefore, rather than sequentially seeking through the VTL data to arrive at a particular point, the data agent 155 could simply go directly to the relevant data on the virtual disk 140 that is the subject of the storage operation.

Indexing Virtual Machine Data

In traditional copy or backup of virtual machines 110, an indexing agent is typically located at each virtual machine 110 or is otherwise associated with each virtual machine 110. The indexing agent indexes data on the virtual machine 110. This results in the creation of one index per virtual machine 110. This facilitates searching of data on a per virtual machine 110 basis, but may make it difficult to search data across multiple virtual machines 110. Moreover, the indexing is performed on the virtual machine 110 and thus uses its resources, which may not be desirable.

In contrast, copying of data of virtual machines 110 using the techniques described herein may use one indexing agent that is associated with multiple virtual machines 110. The sole indexing agent thus indexes multiple virtual machines 110. This results in the creation of one index for the multiple virtual machines 110. The one indexing agent can subdivide or logically separate the single index into multiple sub-indexes for each virtual machine 110. This technique facilitates searching of data using one index across multiple virtual machines 110 and also allows searching on a per virtual machine 110 basis. The sole indexing agent may create the single index using secondary copies of virtual machine data so as not to impact the primary copies or utilize virtual machine resources. The indexed data may be tagged by users. More details as to indexing data are described in the previously-referenced U.S. patent application Ser. No. 11/694, 869.

Classification of Virtual Machine Data

As shown in FIG. 10, clients 1030 and secondary storage computing devices 1065 may each have associated metabases (1070 and 1061, respectively). Each virtual machine 110 may also have its own metabase containing metadata about virtual machine data. Alternatively, one or more virtual machines 110 may be associated with one or more metabases. A classification agent may analyze virtual machines 110 to identify data objects or other files, email, or other information currently stored or present by the virtual machines 110 and obtain certain information regarding the information, such as any available metadata. Such metadata may include information about data objects or characteristics associated with data objects, such as data owner (e.g., the client or user that generates the data or other data manager), last modified time (e.g., the time of the most recent modification), data size (e.g., number of bytes of data), information about the data content (e.g., the application that generated the data, the user that generated the data, etc.), to/from information for email (e.g., an email sender, recipient, or individual or group on an email distribution list), creation date (e.g., the date on which the data object was created), file type (e.g., the format or application type), last accessed time (e.g., the time the data object was most recently accessed or viewed), application type (e.g., the application that generated the data object), location/network (e.g., a current, past, or future location of the data object and network pathways to/from the data object), frequency of change (e.g., a period in which the data object is modified), business unit (e.g., a group or department that generates, manages, or is otherwise associated with the data object), and aging information (e.g., a schedule, which may include a time period, in which the data object is migrated to secondary or long-term storage), etc. The information obtained in this analyzing process may be used to initially create or populate the metabases.

Alternatively or additionally, a journaling agent may populate the metabase with content by accessing virtual machines 110, or by directly accessing virtual resources (e.g., virtual disks 140). The journaling agent may include a virtual filter driver program and may be deployed on a virtual input/output port or data stack and operate in conjunction with a virtual file management program to record a virtual machine's interactions with its virtual data. This may involve creating a data structure such as a record or journal of each interaction. The records may be stored in a journal data structure and may chronicle data interactions on an interaction-by-interaction basis. The journal may include information regarding the type of interaction that has occurred along with certain relevant properties of the data involved in the interaction. The classification agent may analyze and process entries within respective journals associated with journaling agents, and report results to the metabase. More details as to techniques used in the classification of data and journaling of changes to data may be found in the previously-referenced U.S. patent application Ser. No. 11/564,119.

Searching Virtual Machine Data

Once virtual machine data has been indexed and/or classified, users can search for virtual machine data using techniques known to those of skill in the art. The system may provide a single interface directed to enabling the search for virtual machine data (as well as non-virtual machine data). A user can utilize the interface to provide a query which is used to search metabases and/or indices of virtual machine data (as well as non-virtual machine data). The system can in return provide results from the metabases and/or indices relevant to the query that may be segregated based upon their origin (e.g., based upon whether they came from virtual machines or non-virtual machines). The returned results may be optionally analyzed for relevance, arranged, and placed in a format suitable for subsequent use (e.g., with another application), or suitable for viewing by a user and reported. More details as to techniques for searching data and providing results may be found in commonly-assigned U.S. patent application Ser. No. 11/931,034 (entitled METHOD AND SYSTEM FOR SEARCHING STORED DATA), the entirety of which is incorporated by reference herein.

Single or Variable Instancing Virtual Machine Data

Virtual machine data may be single or variable instanced or de-duplicated in order to reduce the number of instances of stored data, sometimes to as few as one. For example, a virtual machine host 105 may host numerous virtual machines 110 configured identically or with slight variations (e.g., the virtual machines have the same operating system files, but different application data files). As another example, a virtual machine 110 may store substantially the same data in a virtual disk 140 that a non-virtual machine stores on its storage devices (e.g., both a virtual machine 110 and a non-virtual machine may have a C:\Windows directory and corresponding system files, and only one instance of each system file may need to be stored). If only a single instance of each data object in this data (the data of both the virtual machines and the non-virtual machines) can be stored on a single instance storage device, significant savings in storage space may be realized.

To single or variable instance virtual machine data, an agent (e.g., a media agent) may generate a substantially unique identifier (for example, a hash value, message digest, checksum, digital fingerprint, digital signature or other sequence of bytes that substantially uniquely identifies the file or data object) for each virtual data object. The word "substantially" is used to modify the term "unique identifier" because algorithms used to produce hash values may result in collisions, where two different files or data objects result in the same hash value. However, depending upon the algorithm or cryptographic hash function used, collisions should be suitably rare and thus the identifier generated for a virtual file or data object should be unique throughout the system.

After generating the substantially unique identifier for the virtual data object, the agent determines whether it should be stored on the single instance storage device. To determine this, the agent accesses a single instance database to determine if a copy or instance of the data object has already been stored on the single instance storage device. The single instance database utilizes one or more tables or other data structures to store the substantially unique identifiers of the data objects that have already been stored on the single instance storage device. If a copy or instance of the data object has not already been stored on single instance storage device, the agent sends the copy of the virtual data object to the single instance storage device for storage and adds its substantially unique identifier to the single instance database. If a copy or instance of the data object has already been stored, the agent can avoid sending another copy to the single instance storage device. In this case, the agent may add a reference (e.g., to an index in the single instance database, such as by incrementing a reference count in the index) to the already stored instance of the data object. Adding a reference to the already stored instance of the data object enables storing only a single instance of the data object while still keeping track of other instances of the data object that do not need to be stored.

Redundant instances of data objects may be detected and reduced at several locations or times throughout the operation of the system. For example, the agent may single or variable instance virtual machine data prior to performing any other storage operations. Alternatively or additionally, the agent may single instance virtual machine data after it has been copied to the secondary storage data store 175. The agent may generate a substantially unique identifier and send it across the network 180 to the single instance database to determine if the corresponding virtual data object should be stored, or the agent may send the virtual data object to the single instance database, which then may generate a substantially unique identifier for it. More details as to single instancing data may be found in one or more of the previously-referenced described in one or more of previously-referenced U.S. patent application Ser. Nos. 11/269,512, 12/145,347, 12/145, 342, 11/963,623, 11/950,376, 61/100,686, and 61/164,803.

Protecting Virtual Machine Data in Homogenous and Heterogeneous Environments

The techniques described herein are applicable in both homogenous and heterogeneous environments. For example, the techniques described herein can be used to copy and restore data from and to virtual machines 110 operating solely on VMware virtual machine hosts (e.g., VMware ESX servers) or on solely Microsoft virtual machine hosts (e.g., on a Microsoft Virtual Server or a Microsoft Windows Server Hyper-V). As another example, the techniques described herein can be used to copy and restore data from and to virtual machines 110 that are operating in a mixed-vendor environment (e.g., virtual machines from VMware, Microsoft, and/or other vendors). The data agent 155 can perform file-level, volume-level, and/or disk-level copies of virtual machines 110 operating on these Microsoft platforms, and perform restores out of file-level, volume-level and disk-level copies.

For example, virtual machines 110 operating on these Microsoft platforms have their virtual disks 140 in *.vhd files. In performing a disk-level copy of a virtual machine 110 operating on a Microsoft platform, the data agent 155 copies the *.vhd files, extracts metadata (e.g., file, volume, disk relationships metadata) from the *.vhd files and stores this metadata. In restoring out of a disk-level copy, the data agent 155 uses the stored metadata to reconstruct the virtual disks 140, volumes and files to allow the data agent 155 to restore files, volumes or entire virtual machines 110. The techniques described herein can also be used to copy and restore data from and to virtual machines 110 operating on virtual machine hosts 105 from other vendors.

Conversion Between Differing Virtual Machine Formats

In the context of a VMware virtual machine 110, in restoring a volume of a virtual machine 110 (e.g., step 930 of the process 900), the secondary storage computing device 1065 restores the volume as a VMware volume, e.g., to a virtual machine 110 operating on a virtual machine host 105. However, the secondary storage computing device 1065 can also restore the volume as a Microsoft volume, e.g., to a virtual machine 110 operating on Microsoft Virtual Server or Microsoft Windows Server Hyper-V. The secondary storage computing device 1065 can thus convert data in the VMware *.vmdk format to data in the Microsoft *.vhd format. This conversion process can also be performed in the opposite direction, e.g., from the Microsoft *.vhd format to the VMware *.vmdk format.

Similarly, in restoring an entire virtual machine 110 (e.g., step 965 of the process 900), the secondary storage computing device 1065 can restore the entire virtual machine 110 as a virtual machine 110 operating on a Microsoft platform. The secondary storage computing device 1065 does so by converting the data in the *.vmdk format to data in the *.vhd format (and associated configuration files). The secondary storage computing device 1065 can thus convert a virtual machine 110 operating on an ESX Server to a virtual machine 110 operating on Microsoft Virtual Server or Microsoft Windows Server Hyper-V. This conversion process can also be performed in the opposite direction, e.g., from the Microsoft *.vhd format to the VMware *.vmdk format. The conversion process enables virtual machine data originating on VMware platforms to be migrated to other platforms, and for virtual machine data originating on non-VMware platforms to be migrated to the VMware platform. Similar conversions can also be performed for virtual disks 140.

To perform the conversion, the secondary storage computing device 1065 may use APIs or other programmatic techniques. For example, to convert a *.vhd file to a *.vmdk file, the secondary storage computing device 1065 may create the *.vmdk file, create necessary data structures (e.g., grain directories and grain tables) within the *.vmdk file, and copy sectors of the volume of the *.vhd file to the *.vmdk file, going extent by extent and creating necessary entries in the data structures (e.g., entries in the grain directories and grain tables) along the way. The secondary storage computing device 1065 may perform a similar process to convert a *.vmdk file to a *.vhd file. As another example, the secondary storage computing device 1065 may analyze a *.vmdk file using an API function, determine its sectors using another API function, copy each sector of to a *.vhd file using a third API function. As another example, the secondary storage computing device 1065 may analyze a *.vhd file using an API function, determine its sectors using another API function, and copy each sector of to a*.vmdk file using a third API function. The secondary storage computing device 1065 may use other techniques (e.g., third-party toolkits) to perform conversions between *.vmdk and *.vhd formats.

Conversion between other formats is also possible. For example, the secondary storage computing device 1065 can convert data between the VMware format and an Open Virtual Machine Format (OVF) and vice-versa. Those of skill in the art will understand that a wide variety of conversions are possible, and the techniques are not limited to the conversions described herein.

Secondary Storage Computing Device Index

As described herein, a secondary storage computing device may maintain an index, a database, or other data structure that it uses to store index data generated during storage operations. The secondary storage computing device may use this index data to quickly and efficiently locate data that has been previously copied. This index data may be used for various purposes, such as for browsing by an administrator and/or for restoring the previously copied data.

During a storage operation involving multiple virtual machines 110, the secondary storage computing device populates one index with metadata corresponding to all the multiple virtual machines 110 (e.g., a master index). For each of the virtual machines 110, the secondary storage computing device also populates an index with metadata corresponding to that virtual machine 110 (e.g., a sub-index). The master index points to (or refers to) the sub-indices. When an operation to restore virtual machine data is to be performed, the master index is accessed. Because the master index points to the sub-indices, these can be accessed, and the indexed data is used so as to present the virtual machine data that is available to be restored. This available virtual machine data is displayed to an administrator segregated by individual virtual machines 110, which is a logical distinction that is likely intuitive to the administrator. Accordingly, accessing individual virtual machine index data involves two levels of indirection, one for the master index, and one for the sub-indices.

Additionally or alternatively, the secondary storage computing device can populate a single index that is subdivided or otherwise logically separated into multiple sub-indexes, one sub-index for each virtual machine 110. When an operation to restore virtual machine data is to be performed, the index data populated by the secondary storage computing device can be used to present the virtual machine data segregated by individual virtual machines 110. Other logical separations and/or segregations of virtual machine data (e.g., by file type, by owner, etc.) are of course possible.

Automatic Throttling of Storage Operations

As described herein, a virtual machine host 105 may host multiple virtual machines 110. If a data agent 155 is to perform simultaneous storage operations on a large number of the virtual machines 110, their performance, individually or collectively, may be adversely affected. This potential adverse effect may be attributable to one or more reasons, such as, for example, the snapshotting of virtual machines 110 prior to copying their data (see FIG. 7). There may not necessarily be a linear relationship between the number of storage operations that the data agent 155 performs (or the number of virtual machines 110 upon which the data agent 155 is performing storage operations) and the reduction in performance. For example, performance may decrease linearly with regards to a first number of concurrent storage operations (e.g., ten concurrent storage operations), and then may drastically decrease after surpassing that first number.

Accordingly, it would be beneficial to be able to limit the number of concurrent storage operations being performed upon the virtual machines 110 hosted by a virtual machine host 105. This could be done in one of several ways. First, there could be a hard limit, or threshold, on the number of simultaneous storage operations performed. For example, the data agent 155 could be limited to performing ten simultaneous storage operations (e.g., upon ten different virtual machines 110). The data agent 155 could distribute the ten simultaneous storage operations across the sub-clients corresponding to the virtual machines 110. For example, if a single virtual machine host 105 hosts 50 virtual machines 110 distributed across five sub-clients, the data agent 155 could be limited to performing two simultaneous storage operations (e.g., upon two virtual machines 110) per sub-client.

Second, the number of concurrent storage operations could be limited based upon the performance of one or more individual virtual machines 110 and/or the performance of the virtual machine host 105. The data agent 155 can measure performance using standard metrics (e.g., number of disk writes and/or reads per second, central processing unit (CPU) usage, memory usage, etc.). If the data agent 155 determines that the performances of the virtual machines 110 are below a certain performance threshold, the data agent 155 could reduce the number of simultaneous storage operations that it performs. Alternatively, if the data agent 155 determines that the performances of the virtual machines 110 exceed the certain performance threshold, the data agent 155 could increase the number of simultaneous storage operations that it performs.

Third, the throughput of concurrent storage operations could be reduced so as to utilize less of the resources (e.g., CPU, disk, memory, network bandwidth, etc.) of the virtual machines 110 and/or the virtual machine host 105. This reduction in throughput may lessen the loads placed upon the virtual machines 110 and/or the virtual machine host 105 by the simultaneous storage operations. However, this may also necessitate lengthening the window of time in which the storage operations are performed. In each of these three approaches, if the data agent 155 is unable to perform a storage operation upon a virtual machine 110, the data agent 155 may flag the virtual machine 110 for later performance of a storage operation and move to the next virtual machine 110. These three approaches are not mutually exclusive, and combinations of two or more of the three may be used so as to optimally perform storage operations upon virtual machines 110.

Figure 11:
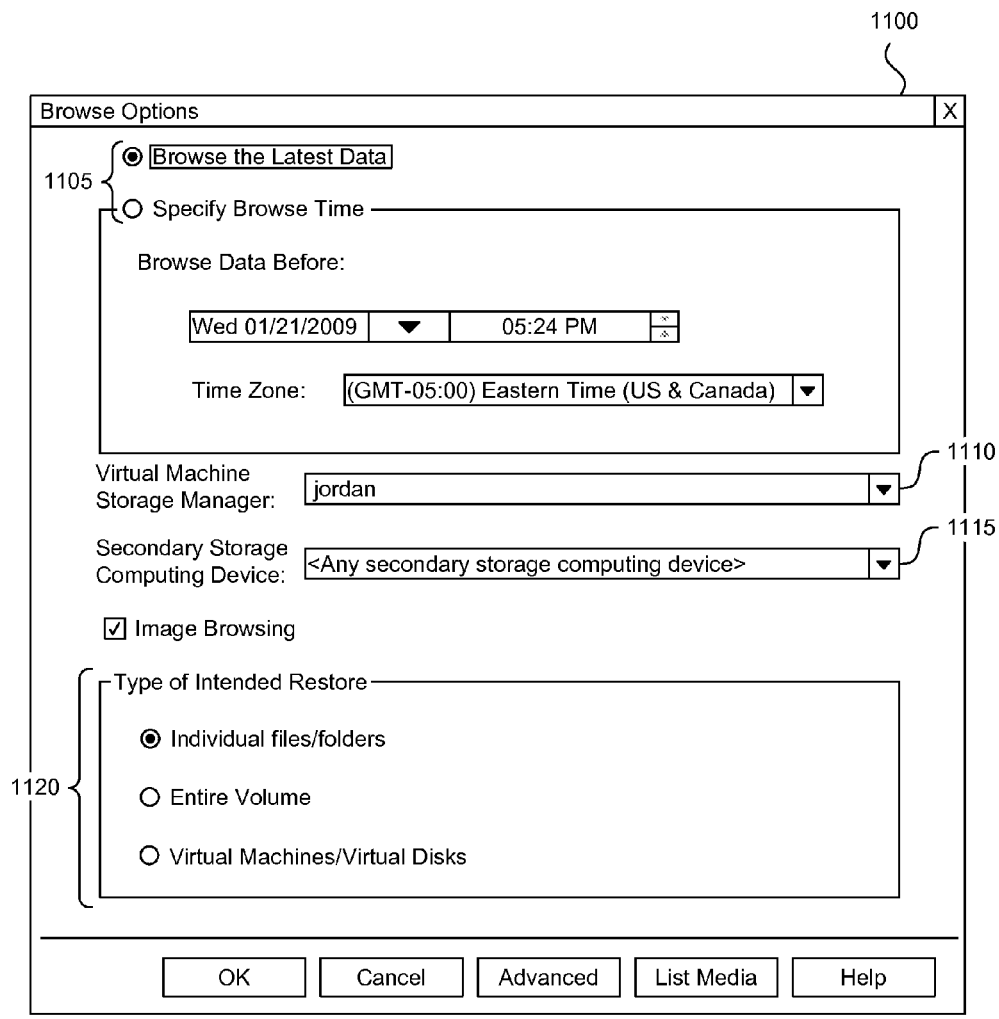
FIGS. 11-15 are display diagrams illustrating example interfaces provided by aspects of the invention.

Additional Interfaces for Configuring Storage Operations for Virtual Machine Data FIG. 11 is a display diagram illustrating an example interface 1100 provided by aspects of the invention. The interface 1100 enables an administrator to browse copied virtual machine data for purposes of restoring it. The administrator can specify that the latest data is to be browsed or specify a point in time before which the data is to be browsed using options 1105. The administrator can also select a virtual machine storage manager 145 using list box 1110 and a secondary storage computing device 1065 using list box 1115. The administrator can also select the intended type of restore using options 1120: either restoration of individual files and/or folders, restoration of entire volumes, or restoration of virtual machines and/or virtual disks.

Figure 12:
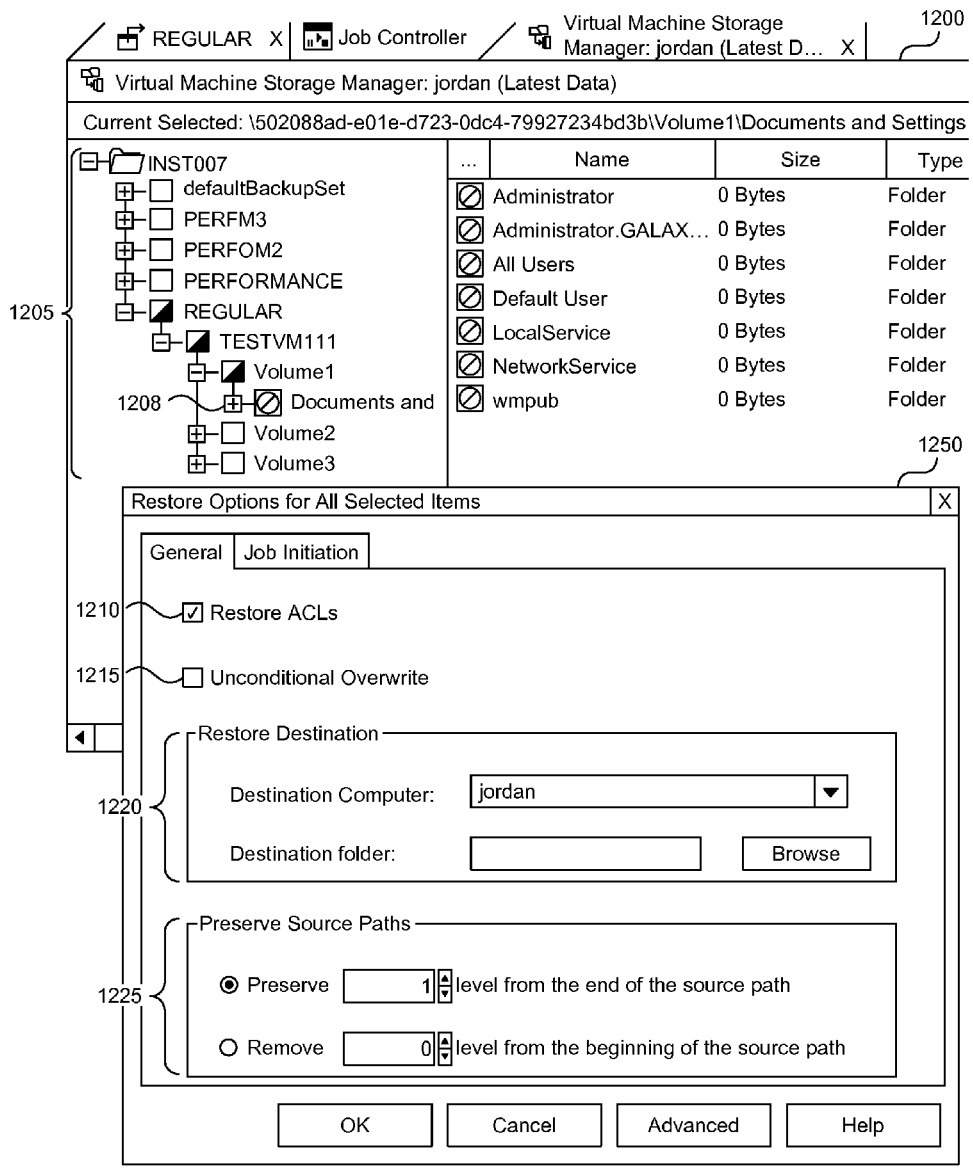

FIG. 12 is a display diagram illustrating example interfaces 1200 and 1250 provided by aspects of the invention. The interface 1200 may be shown after the administrator has selected to browse the latest data (e.g., reference character 1105 of FIG. 11) and the selected intended restoration is that of individual files and/or folders (e.g., reference character 1120 of FIG. 11). The interface 1200 includes a folder structure 1205 corresponding to the copied virtual machine data. As shown, a folder 1208 within a volume (Volume 1) of a virtual machine (TESTVM111) is selected. The interface 1250 provides the administrator with options for restoring the selected folder. These include an option 1210 to restore ACLS associated with the virtual machine data and an option 1215 to unconditionally overwrite data. The administrator can specify the destination computer and folder in region 1220. The administrator can also specify options for preserving or removing source paths in region 1225.

Figure 13A:
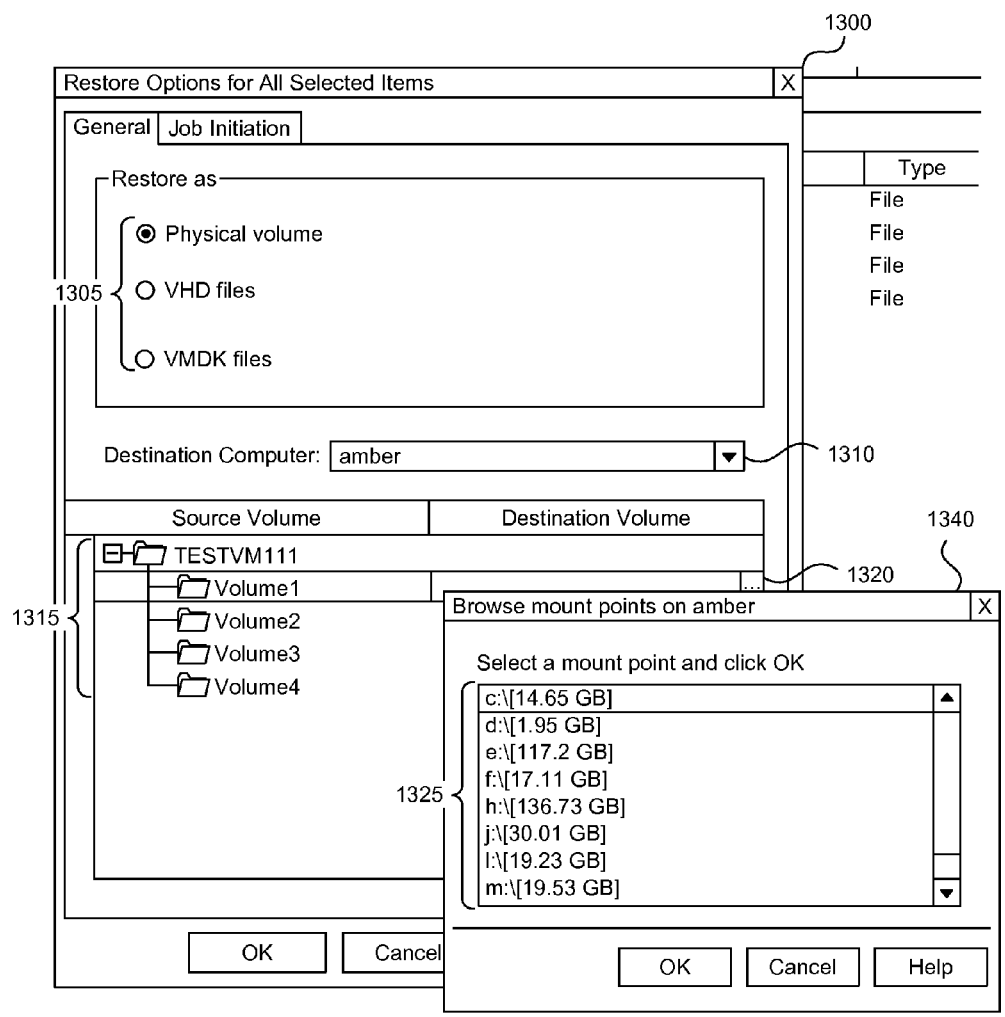
Figure 13B:
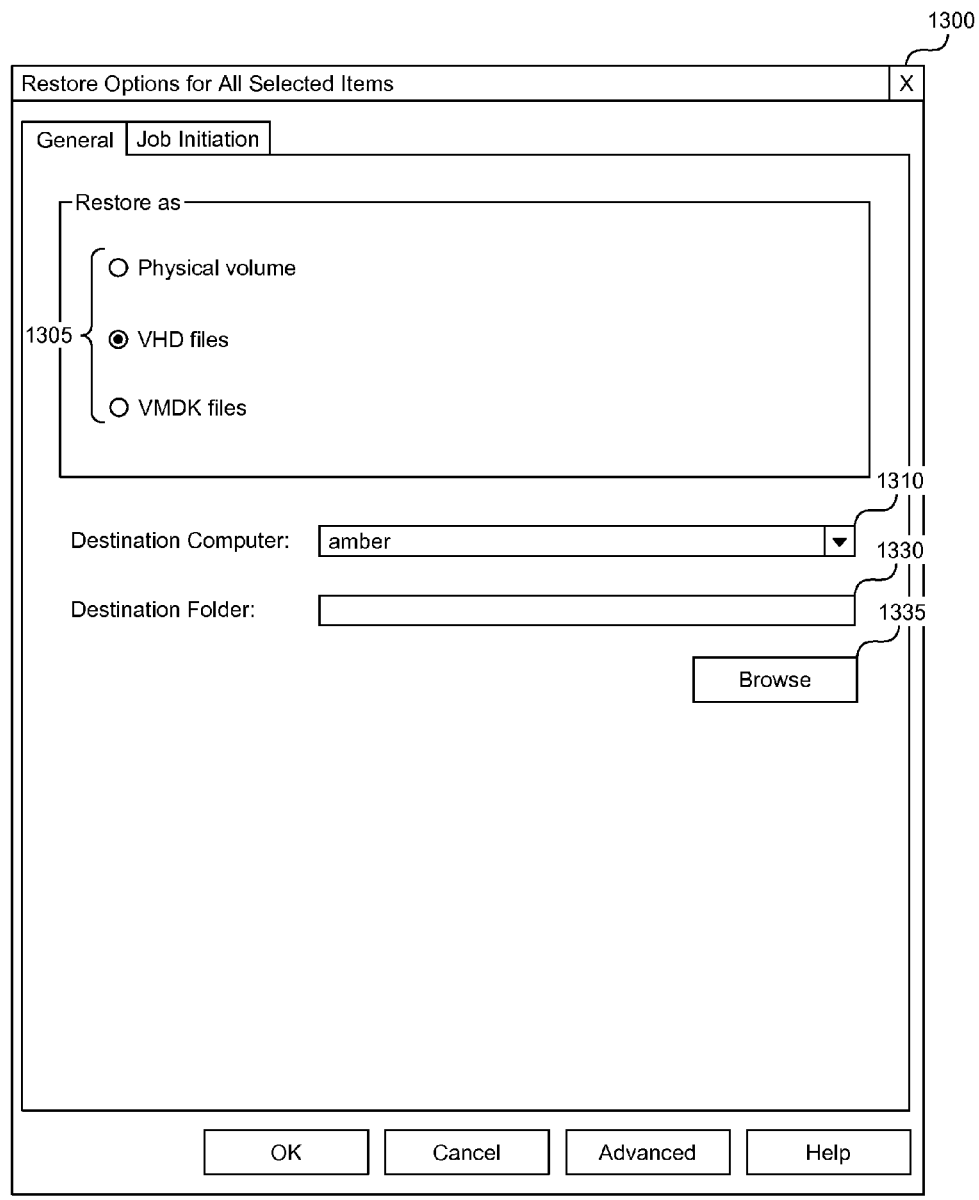

FIGS. 13A and 13B are display diagrams illustrating example interfaces 1300 and 1340 provided by aspects of the invention. The interface 1300 may be shown after the administrator has selected the intended restoration to be that of an entire volume (e.g., reference character 1120 of FIG. 11). The interface 1300 allows the administrator to select to restore a volume as a physical volume, as a *.vhd file (corresponding to Microsoft virtual machines), or as a *.vmdk file (corresponding to VMware virtual machines) using options 1305. The administrator can also select a destination computer in list box 1310, a source volume to be restored in region 1315, and a destination volume using button 1320. Selecting the button 1320 causes the interface 1340 to be displayed, which allows the administrator to select a mount point on the selected destination computer from available mount points listed in region 1325.

FIG. 13B illustrates the interface 1300 when the administrator has selected to restore a volume as a *.vhd file from the options 1305. The administrator can select a destination computer in list box 1310 and a destination folder for the *.vhd file can be selected using button 1335. Once selected, the destination folder will be displayed in text box 1330.

Figure 14A:
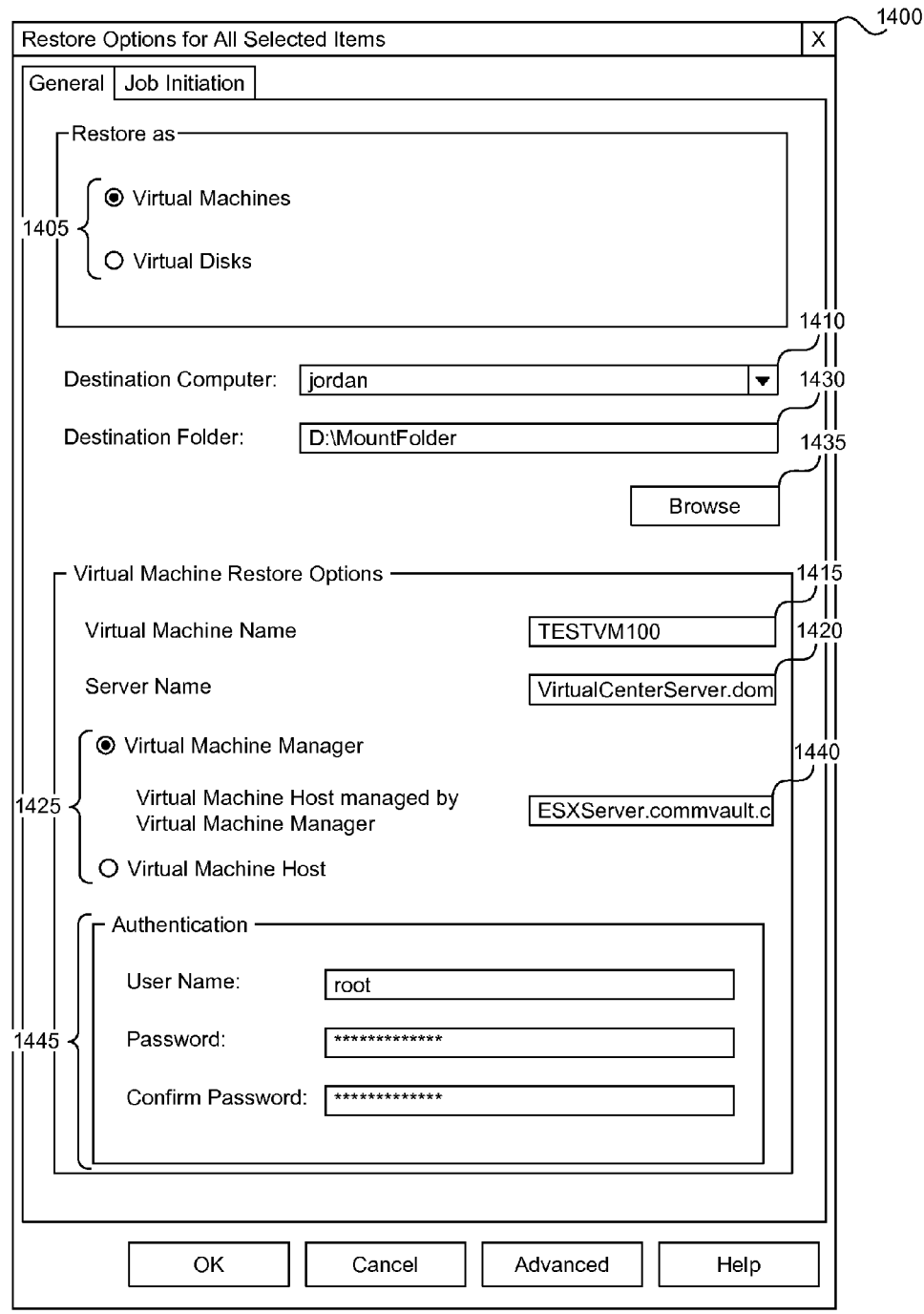
Figure 14B:
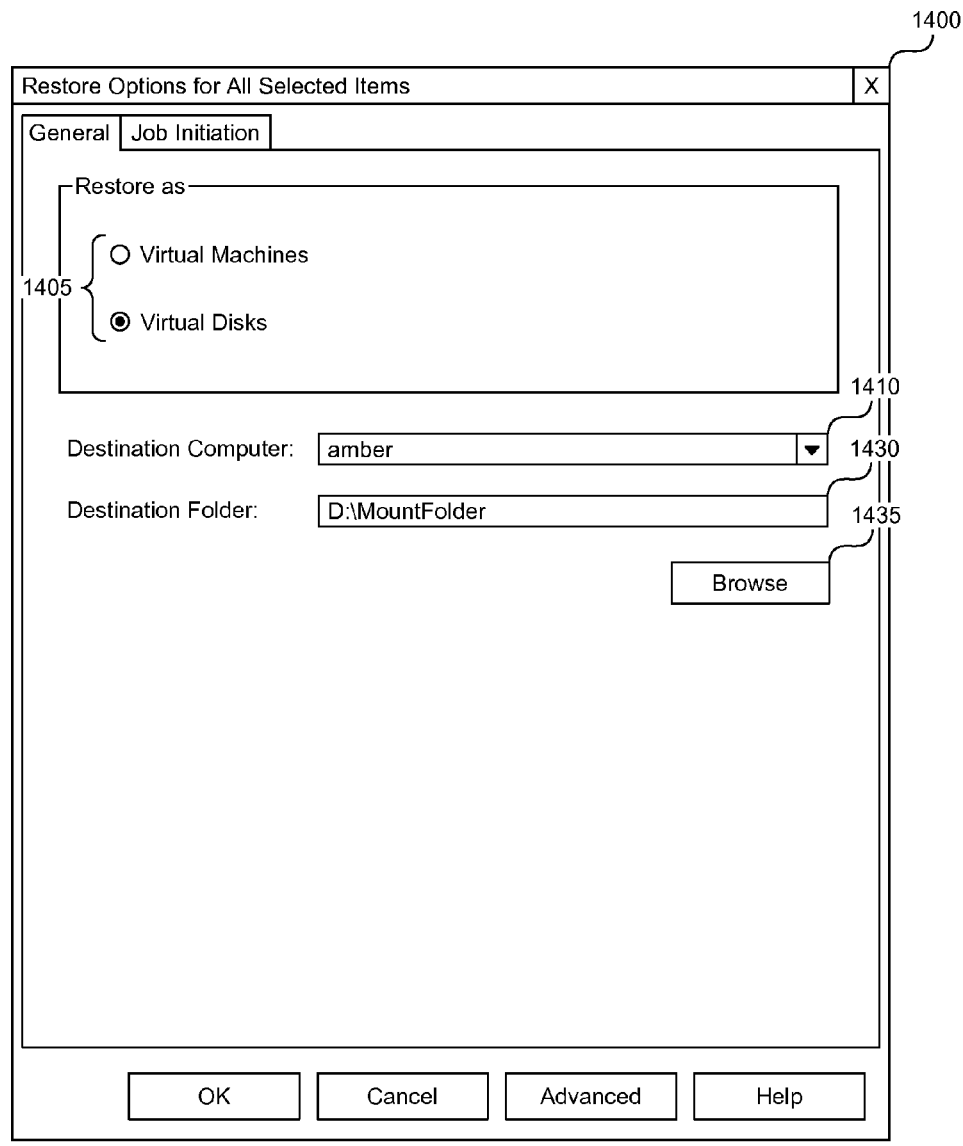

FIGS. 14A and 14B are display diagrams illustrating an example interface 1400 provided by aspects of the invention. The interface 1400 may be shown after the administrator has selected the intended restoration to be that of virtual machines or virtual disks (e.g., reference character 1120 of FIG. 11). The interface 1400 allows the administrator to select to restore either a virtual machine or virtual disks. As with the interface 1300, the administrator can select a destination computer in list box 1410 and a destination folder using button 1435. Once selected, the destination folder will be displayed in text box 1430. If restore of virtual machines is selected (FIG. 14A), the administrator can provide the name of the virtual machine to be restored in text box 1415, and the name of the server to which it is to be restored in text box 1420. If the virtual machine is to be restored to a virtual machine host 105, the administrator selects this option 1425 and specifies the name of the virtual machine host 105 in text box 1420. If the virtual machine is to be restored to a virtual machine host managed by a virtual machine manager 202, the administrator selects this option 1425 and provides the name of the virtual machine manager 202 in text box 1420 and the name of the virtual machine host 105 in text box 1440. The administrator also specifies authentication credentials in region 1445.

Figure 15:
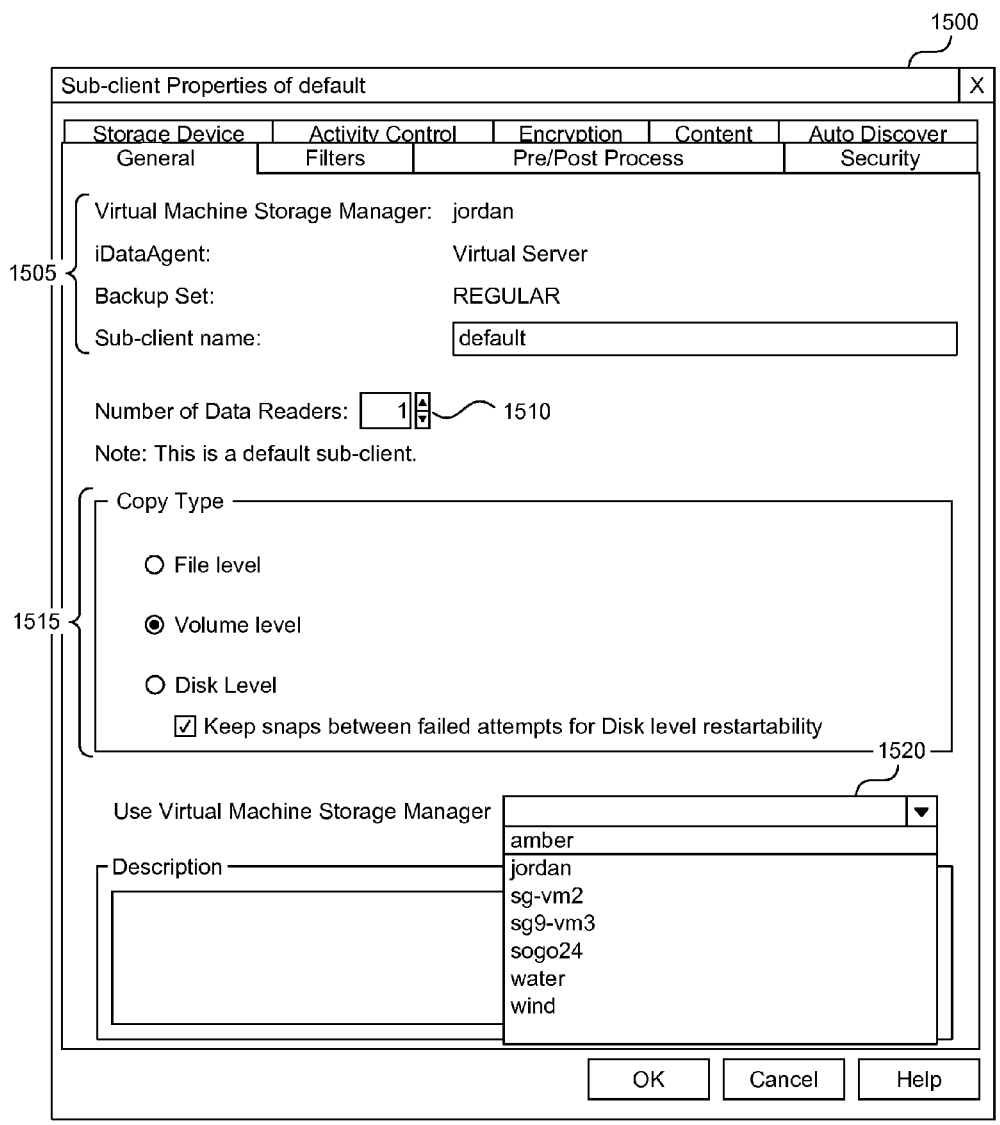

FIG. 15 is a display diagram illustrating an example interface 1500 provided by aspects of the invention. The interface 1500 allows the administrator to specify options for storage operations for a sub-client. Region 1505 displays information associated with the sub-client. The administrator can specify the number of data readers to use in performing storage operations using spinner 1510. The specified number of data readers corresponds to the number of storage operations to be simultaneous performed on the virtual machines 110 associated with the sub-client. As described herein, the number of simultaneous storage operations may be limited or capped so as not to adversely affect performance of the virtual machines 110.

The administrator can also specify the type of copy operation to be performed using options 1515: either file level, volume level, or disk level. The administrator can also select one or more virtual machine storage managers 145 that are to perform the copy operations using list box 1520. Generally, the administrator has to select at least one virtual machine storage manager 145 to perform the copy operation.

If the administrator selects two or more virtual machine storage managers 145 in the list box 1520, this causes the copy operation, when it commences, to be performed by the selected virtual machine storage managers 145. This can assist in load balancing and provide other benefits. For example, one or more sub-clients could be configured to perform copy operations upon all the virtual machines 110 associated with a specific virtual machine manager 202. This could be a large number of virtual machines 110, and if only one virtual machine storage manager 145 were to perform copy operations upon the one or more sub-clients' virtual machines 110, it could take a lengthy period of time to conclude all the copy operations. Accordingly, distributing copy operations across multiple virtual machine storage managers 145 can shorten the amount of time it takes to conclude all the copy operations. This can be true even in the case of a single virtual machine 110 (for example, when the single virtual machine 110 contains a large amount of data). This workload balancing can provide significant benefits, such as when copy operations need to be performed entirely within a specific window of time (e.g., from 2:00 a.m. to 4:00 a.m.). Moreover, such load balancing only requires a single virtual machine storage manager 145 to coordinate the performance of the copy operations by the multiple virtual machine storage managers 145.

For example, an administrator could select a first virtual machine storage manager 145 that coordinates the copying of data of multiple virtual machines 110. The administrator could also select one or more second virtual machine storage managers 145 to perform the copying of data of multiple virtual machines 110. The first data agent 155 can allocate responsibility for the copying of the data amongst the second virtual machine storage managers 145 such that the copying is more or less evenly distributed based upon selections previously made (static load-balancing).

Additionally or alternatively, the first virtual machine storage manager 145 can distribute the copy operations across the second virtual machine storage managers 145 based upon various factors. Consider an example where ten copy operations of the data of ten virtual machines 110 are to be performed, and where two second virtual machine storage managers 145 can be used to perform the copy operations. The first virtual machine storage manager 145 can determine an availability of the second virtual machine storage managers 145, as measured by percentage of CPU usage, percentage of network utilization, disk utilization, average time spent performing storage operations, and/or other factors. For example, if the first virtual machine storage manager 145 determines that one of the second virtual machine storage managers 145 have a percentage of CPU usage of 10%, and that the other second virtual machine storage manager 145 has a percentage of CPU usage of 50%, the storage manager 1005 may allocate eight of the copy operations to the one second virtual machine storage manager 145 and the remaining two copy operations to the other second virtual machine storage manager 145, based upon this measurement of availability (dynamic load-balancing). The first virtual machine storage manager 145 may also use other factors known to those of skill in the art to balance the workloads of the two virtual machine storage managers 145. Additionally or alternatively, the storage manager 1005 may perform the load-balancing amongst the multiple virtual machine storage managers 145.

Copying of Virtual Machine Data on an Incremental Basis

As described herein, the primary storage data store 135 stores the data of virtual machines 110. The data is organized into multiple blocks of fixed size (e.g., 64 kb, 128 kb, 256 kb, 512 kb, etc.). A data agent 155 can perform full copies of data of virtual machines 110 using the blocks of data. In some instances, it may not be necessary to perform a second full backup of virtual machine data after a first full backup has been performed (at least not until a set period of time has elapsed). Rather, incremental and/or differential backups of virtual machine data may suffice.

FIG. 16 is a flow diagram illustrating a process 1600 for copying virtual machine data on an incremental basis (or a differential basis, but incremental copies are described herein for brevity). The process 1600 may be performed by the data agent 155. The data agent 155 begins at step 1605 by accessing data structures within virtual disk files 140. As described herein, virtual disks 140 can be growable or preallocated. In either case, virtual disks 140 may use internal data structures to specify the blocks that have been allocated and/or are being used by the virtual machines 110. For example, VMware virtual machine disk files (*.vmdk files) include grain directories and grain tables, and Microsoft virtual disk files (*.vhd files) include block allocation tables. These internal data structures specify the blocks within virtual disks 140 that have been allocated and/or are being used for data storage.

At step 1610, the data agent 155 determines the blocks that have been allocated and/or are being used within the virtual disks 140. At step 1615 the data agent 155 accesses a block identifier data structure to make the determination of which blocks have changed since the last storage operation involving a full copy of the virtual machine data.

FIG. 17 is a diagram illustrating an example table 1700 that may be employed as a block identifier data structure. The data agent 155 may create the table 1700 during, for example, a storage operation that performs a full copy of all of the data of the virtual machine 110. The table 1700 includes a block identifier column 1702 and a substantially unique identifier column 1704. The block identifier column 1702 stores identifiers of blocks within a virtual disk 140. Block may be identified by their order within a virtual disk 140. For example, a first block may have an identifier of one ("1"), a second block may have an identifier of two ("2"), and so forth. The substantially unique identifier column 1704 stores identifiers generated for the block by the data agent 155. For example, substantially unique identifiers could be generated using Message Digest Algorithm 5 (MD5) or Secure Hash Algorithm SHA 512. Although the table 1700 is illustrated as including three rows 1706 of three different blocks, the table 1700 generally includes one row for each block in a virtual disk 140.

Returning to FIG. 16, at step 1620, for each block that the data agent 155 determines has been allocated and/or is in use, the data agent 155 generates a substantially unique identifier. At step 1625, the data agent 155 finds the row in the table 1700 for which the block identifier of column 1702 is the same as the block identifier of the block currently being processed. The data agent 155 then looks up the substantially unique identifier in the column 1704, and compares it to the generated substantially unique identifier. If the two substantially unique identifiers do not match, then the block currently being processed has changed. The process 1600 then continues at step 1630 where the data agent 155 copies the block to a storage device. The data agent 155 then updates the column 1704 of the table 1700 with the generated substantially unique identifier. At step 1640, the data agent 155 determines whether there are more blocks to process. If so, the process 1600 returns to step 1620. If not, the process 1600 concludes. If the block has not changed (step 1625), the process 1600 continues at step 1640. The next time the data agent 155 performs a full copy of all of the data of the virtual machine 110, the data agent 155 can regenerate substantially unique identifiers for blocks of data and repopulate or recreate the table 1700.

If, at step 1625, the data agent 155 cannot find a row in the table 1700 for which the block identifier of column 1702 is the same as the block identifier of the block currently being processed, this generally indicates that the data agent 155 is currently processing a block that has been allocated and/or has been put to use since the time at which the last full copy operation was performed. If this is the case, the data agent 155 will copy the block to the storage device, and at step 1635 the data agent will add a row to the table 1700 with the block identifier and the generated substantially unique identifier.

The process 1600 and the table 1700 thus enable copying of virtual machine data on an incremental basis. This can provide significant advantages in that it allows for only copying the data that has changed while still providing for protection of virtual machine data. Changes can be made to the process 1600 and/or the table 1700 while still retaining the ability to perform storage operations on an incremental basis. For example, a monitoring agent could monitor the blocks of the virtual disks 140 and, each time a block is changed (e.g., due to a write operation), the monitoring agent could set a flag (or bit) for the block in a data structure. When the data agent 155 is to perform an incremental copy, it can access the data structure containing the flags and only copy blocks that have been flagged. As another example, the table 1700 could include a time copied column to store timestamps of when a block was last copied to a storage device. If the difference between the time of the incremental copy operation and the last time copied is greater than a threshold time, the data agent 155 could copy the block to the storage device, regardless of whether the generated substantially unique identifier matches the stored substantially unique identifier.

CONCLUSION

From the foregoing, it will be appreciated that specific embodiments of the storage system have been described herein for purposes of illustration, but that various modifications may be made without deviating from the spirit and scope of the invention. For example, although copy operations have been described, the system may be used to perform many types of storage operations (e.g., backup operations, restore operations, archival operations, copy operations, CDR operations, recovery operations, migration operations, HSM operations, etc.). Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the inventors reserve the right to add additional claims after filing the application to pursue such additional claim forms for other aspects of the invention.

We claim:

1. A method of managing data of one or more virtual machines hosted by a virtual machine host, wherein the method is performed by one or more computing systems, each computing system having a processor and memory, the method comprising:

receiving a request to copy data of at least one virtual machine to a storage device, wherein the at least one virtual machine stores data in at least one virtual machine disk file residing on a filesystem of the virtual machine host;

determining the at least one virtual machine disk file in which the at least one virtual machine stores data;

copying the at least one virtual machine disk file from the filesystem of the virtual machine host to the storage device;

extracting, by the one or more computing systems, information from the at least one virtual machine disk file, wherein extracting information includes extracting at least one of the following:

information that describes a virtual volume utilized by the at least one virtual machine;

information that describes a location of a virtual file allocation table utilized by the at least one virtual machine, wherein the virtual file allocation table provides for locations of virtual files within the virtual volume; and information that describes a relationship between the at least one virtual machine disk file and another virtual machine disk file in which the at least one virtual machine stores data;

associating the extracted information with the at least one virtual machine; and storing the extracted information in association with the at least one virtual machine.

2. The method of claim 1, further comprising:
receiving a request to copy a virtual file contained within the virtual machine disk file stored on the storage device to a requested location;
accessing the at least one virtual machine disk file stored on the storage device;
accessing the stored extracted information;
determining, based on the stored extracted information, the location of the virtual file within the at least one virtual machine disk file;
extracting the virtual file from within the at least one virtual machine disk file; and
copying the virtual file to the requested location.

3. The method of claim 1, further comprising:
receiving a request to copy a virtual volume contained within the virtual machine disk file stored on the storage device to a requested location;
accessing the at least one virtual machine disk file stored on the storage device;
accessing the stored extracted information;
determining, based on the stored extracted information, the location of the virtual volume within the at least one virtual machine disk file;
extracting the virtual volume from within the at least one virtual machine disk file; and
copying the virtual volume to the requested location.

4. The method of claim 1, further comprising:
receiving a request to copy the at least one virtual machine disk file stored on the storage device to a requested location;
accessing the at least one virtual machine disk file stored on the storage device; and
copying the at least one virtual machine disk file to the requested location.

5. The method of claim 1, wherein the virtual machine disk file is in a first format, and further comprising:
receiving a request to convert the at least one virtual machine disk file to a second format;
accessing the at least one virtual machine disk file stored on the storage device; and
converting the at least one virtual machine disk file to the second format.

6. The method of claim 1, further comprising:
determining distinct data objects within the at least one virtual machine disk file based at least in part upon the extracted information;
indexing distinct data objects within the at least one virtual machine disk file; and
storing the indexed distinct data objects in an index, wherein the index also includes data associated with at least one non-virtual machine.

7. The method of claim 1, further comprising:
determining distinct data objects within the at least one virtual machine disk file based at least in part upon the extracted information;
indexing distinct data objects within the at least one virtual machine disk file;
storing the indexed distinct data objects in an index, wherein the index also includes data associated with at least one non-virtual machine:
receiving a request to query the index; and
returning search results responsive to the request, wherein the search results include search results associated with distinct data objects of the least one virtual machine and with distinct data objects at least one non-virtual machine.

8. The method of claim 1, further comprising:
determining distinct data objects within the at least one virtual machine disk file based at least in part upon the extracted information; and
for each of the distinct data objects:
generating a substantially unique identifier for the distinct data object;
determining, based on the substantially unique identifier, if an instance of the distinct data object has already been stored on a single instance storage device; and
if an instance of the distinct data object has not already been stored on the single instance storage device, then storing the data object on the single instance storage device.

9. A computer-readable storage medium whose contents cause one or more computing systems to perform a method of managing data of one or more virtual machines hosted by a virtual machine host, wherein each of the one or more computing systems has a processor and memory, the method comprising:
receiving a request to copy data of a virtual machine to a storage device, wherein the virtual machine stores data in a virtual machine disk file residing on a filesystem of the virtual machine host;
determining the virtual machine disk file in which the virtual machine stores data;
copying the virtual machine disk file from the filesystem of the virtual machine host to the storage device;
extracting, by the one or more computing systems, information from the virtual machine disk file, wherein extracting information includes extracting information that either describes locations of data objects within the virtual machine disk file or describes a location of a data object locator data structure within the virtual machine disk file;
associating the extracted information with the virtual machine; and
storing the extracted information in association with the virtual machine.

10. The computer-readable storage medium of claim 9, wherein the method further comprises:
receiving a request to copy a data object contained within the virtual machine disk file stored on the storage device to a requested location;
accessing the virtual machine disk file stored on the storage device;
accessing the stored extracted information;
determining, based at least in part on the stored extracted information, the location of the data object within the virtual machine disk file;
extracting the data object from within the virtual machine disk file; and
copying the data object to the requested location.

11. The computer-readable storage medium of claim 9, wherein the method further comprises:
determining, based at least in part upon the extracted information, data objects within the virtual machine disk file;
indexing data objects within the virtual machine disk file; and
storing the indexed data objects in an index, wherein the index also includes data associated with at least one non-virtual machine.

12. The computer-readable storage medium of claim 9, wherein the method further comprises:
determining data objects within the virtual machine disk file based at least in part upon the extracted information; and
for at least one of the data objects:
generating a substantially unique identifier for the data object;
determining, based on the substantially unique identifier, if an instance of the data object has already been stored on a storage device; and
if an instance of the data object has not already been stored on the storage device, then storing the data object on the storage device.

13. A computing system for managing data of one or more virtual machines hosted by a virtual machine host, the computing system comprising:
means for receiving a request to copy data of a virtual machine, wherein the virtual machine stores data in a virtual machine disk file residing on a filesystem of the virtual machine host;
means for determining the virtual machine disk file in which the virtual machine stores data;
means for copying the virtual machine disk file from the filesystem of the virtual machine host to the storage device;
means for extracting information from the virtual machine disk file, wherein extracting information includes extracting information that either describes locations of data objects within the virtual machine disk file or describes a location of a data object location data structure within the virtual machine disk file; and
means for associating the extracted information with the virtual machine; and
means for storing the extracted information in association with the virtual machine.

14. The computing system of claim 13, further comprising:
means for determining, based at least in part upon the extracted information, data objects within the virtual machine disk file;
means for indexing data objects within the virtual machine disk file; and
means for storing the indexed data objects in an index, wherein the index also includes data associated with at least one non-virtual machine.

15. The computing system of claim 13, further comprising:
means for determining data objects within the virtual machine disk file based at least in part upon the extracted information;
means for generating a substantially unique identifier for at least one of the data objects;
means for determining, based on the substantially unique identifier, if an instance of the at least one data object has already been stored; and
means for storing the at least one data object if an instance of the data object has not already been stored.

16. A method of managing data of one or more virtual machines hosted by a virtual machine host, wherein the method is performed by one or more computing systems, each computing system having a processor and memory, the method comprising:
receiving a first request to copy data of at least one virtual machine to a first storage device, wherein the at least one virtual machine stores data in at least one virtual machine disk file residing on a filesystem of the virtual machine host;
determining, by the one or more computing systems, the at least one virtual machine disk file in which the at least one virtual machine stores data, wherein the at least one virtual machine disk file includes multiple blocks of data;
determining blocks within the at least one virtual machine disk file that are used by the at least one virtual machine;
for at least some of the determined blocks, generating substantially unique identifiers;
storing the generated substantially unique identifiers in a data structure;
copying at least some of the blocks of the at least one virtual machine disk file from the filesystem of the virtual machine host to the first storage device;
receiving a second request to copy data of the at least one virtual machine to a second storage device;
determining blocks within the at least one virtual machine disk file that are used by the at least one virtual machine;
for at least one of the determined blocks:
generating a substantially unique identifier;
determining from the data structure if the generated substantially unique identifier is equivalent to a substantially unique identifier in the data structure; and
when the generated substantially unique identifier is not equivalent to a substantially unique identifier in the data structure, copying the block to the second storage device.

17. The method of claim 16, wherein the data structure includes multiple items of data, and wherein the method further comprises when the generated substantially unique identifier is not equivalent to a substantially unique identifier in the data structure, updating an existing item of data in the data structure to include the generated substantially unique identifier.

18. The method of claim 16, wherein the data structure includes multiple items of data, and wherein the method further comprises when the generated substantially unique identifier is not equivalent to a substantially unique identifier in the data structure, adding an existing item of data to the data structure that includes the generated substantially unique identifier.

19. The method of claim 16, further comprising when the generated substantially unique identifier is equivalent to a substantially unique identifier in the data structure, avoiding copying the block to the second storage device.

20. A computer-readable storage medium whose contents cause one or more computing systems to perform a method of managing data of one or more virtual machines hosted by a virtual machine host, wherein each computing system having a processor and memory, the method comprising:
- receiving a request to copy data of at least one virtual machine to a storage device, wherein the at least one virtual machine stores data in at least one virtual machine disk file residing on a filesystem of the virtual machine host;
- determining the at least one virtual machine disk file in which the at least one virtual machine stores data;
- copying the at least one virtual machine disk file from the filesystem of the virtual machine host to the storage device;
- extracting, by the one or more computing systems, information from the at least one virtual machine disk file, wherein extracting information includes extracting at least one of the following:
  - information that describes a virtual volume utilized by the at least one virtual machine;
  - information that describes a location of a virtual file allocation table utilized by the at least one virtual machine, wherein the virtual file allocation table provides for locations of virtual files within the virtual volume; and
  - information that describes a relationship between the at least one virtual machine disk file and another virtual machine disk file in which the at least one virtual machine stores data;
- associating the extracted information with the at least one virtual machine; and
- storing the extracted information in association with the at least one virtual machine.

21. The computer-readable storage medium of claim 20, wherein the method further comprises:
- receiving a request to copy a virtual file contained within the virtual machine disk file stored on the storage device to a requested location;
- accessing the at least one virtual machine disk file stored on the storage device;
- accessing the stored extracted information;
- determining, based on the stored extracted information, the location of the virtual file within the at least one virtual machine disk file;
- extracting the virtual file from within the at least one virtual machine disk file; and
- copying the virtual file to the requested location.

* * * * *

UNITED STATES PATENT AND TRADEMARK OFFICE
CERTIFICATE OF CORRECTION

PATENT NO. : 8,725,973 B2  
APPLICATION NO. : 13/667890  
DATED : May 13, 2014  
INVENTOR(S) : Anand Prahlad et al.

Page 1 of 1

It is certified that error appears in the above-identified patent and that said Letters Patent is hereby corrected as shown below:

On the title page, item (75), in column 1, in "Inventors", line 4-5, delete "Ocean City," and insert -- Ocean, --, therefor.

On title page 2, in column 2, References Cited under "Other Publications", line 28, delete "Knowlegebase," and insert -- Knowledgebase, --, therefor.

On title page 3, in column 1, References Cited under "Other Publications", line 2, delete "vnnware" and insert -- vmware --, therefor.

On title page 3, in column 1, References Cited under "Other Publications", line 31, delete "monolithicversusspllit" and insert -- monolithicversussplit --, therefor.

In the Specification

Column 16, line 14, delete "listbox" and insert -- list box --, therefor.

Column 21, line 48, delete "inferring" and insert -- and inferring --, therefor.

Column 22, line 24-25, delete "relationships between" and insert -- and relationships between --, therefor.

Column 37, line 53, delete "copy" and insert -- and copy --, therefor.

Column 39, line 62, delete "ACLS" and insert -- ACLs --, therefor.

Signed and Sealed this  
Fourteenth Day of October, 2014

Michelle K. Lee  
*Deputy Director of the United States Patent and Trademark Office*